(12) United States Patent
Ohishi et al.

(10) Patent No.: US 7,092,960 B2
(45) Date of Patent: Aug. 15, 2006

(54) CHEMICAL MATERIAL INTEGRATED MANAGEMENT SYSTEM AND METHOD THEREOF

(75) Inventors: Satoshi Ohishi, Hitachi (JP); Yoshiaki Ichikawa, Tokai-mura (JP); Akira Sekine, Hitachiota (JP); Takako Oono, Hitachi (JP); Tetsuya Matsui, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 598 days.

(21) Appl. No.: 09/796,066

(22) Filed: Feb. 28, 2001

(65) Prior Publication Data

US 2001/0025282 A1    Sep. 27, 2001

(51) Int. Cl.
*G06F 7/00* (2006.01)

(52) U.S. Cl. .................... 707/103 R; 707/10
(58) Field of Classification Search ............ 707/103 R, 707/1–10, 202, 204, 209; 702/19; 700/266
See application file for complete search history.

(56) References Cited

U.S. PATENT DOCUMENTS

| | | | | |
|---|---|---|---|---|
| 4,034,339 A | * | 7/1977 | Free et al. .................... 714/45 |
| 5,311,437 A | | 5/1994 | Leal et al. |
| 5,532,928 A | * | 7/1996 | Stanczyk et al. ............. 705/7 |
| 5,668,094 A | * | 9/1997 | Bacon et al. ................ 510/101 |
| 5,726,884 A | * | 3/1998 | Sturgeon et al. ............. 705/9 |
| 5,987,390 A | * | 11/1999 | Ladunga ...................... 702/19 |
| 6,097,995 A | * | 8/2000 | Tipton et al. ................ 700/266 |
| 6,256,640 B1 | * | 7/2001 | Smalley et al. ............. 707/104.1 |
| 6,341,287 B1 | * | 1/2002 | Sziklai et al. ............... 707/102 |

| | | | |
|---|---|---|---|
| 2001/0000807 A1 | * | 5/2001 | Freire et al. |
| 2003/0004965 A1 | * | 1/2003 | Farmer et al. |

FOREIGN PATENT DOCUMENTS

| | | |
|---|---|---|
| EP | 0 964 349 | 12/1999 |
| JP | 08-044759 | 2/1996 |
| JP | 11-161709 | 6/1999 |
| JP | 11-353384 | 12/1999 |
| JP | 2002-149789 | * 5/2002 |
| WO | WO 98/11493 | 3/1998 |

OTHER PUBLICATIONS

The Hitachi Hyouron, vol. 81, No. 12, "Total Solutions and Systematization for Industrial Innovation: Ecology Information Systems for Circulatory Society," issued by Hitachi Hyoronsha on Dec. 1, 1999, pp. 31-34 (in Japanese).

(Continued)

*Primary Examiner*—Sathyanarayan Pannala
(74) *Attorney, Agent, or Firm*—Kenyon & Kenyon LLP

(57) ABSTRACT

A chemical substance total management system and a chemical substance total management method which can easily manage amounts and release destination of managing substances. The chemical substance total management system includes a material composition database of component composition information of material or product in a form of database, a managing substance database in a form of a list of substance requiring management, for identifying substances constituting the material or product on the basis of the material composition database and identifying substance required management on the basis of the managing substance database for managing chemical substance contained in the material handled by a business entity or product. The system further includes release coefficient database storing weight ratio data in each transfer and release destination per the identified management required substance in a form of database.

2 Claims, 27 Drawing Sheets

OTHER PUBLICATIONS

The Hitachi Hyouron, vol. 82, No. 1, p. 110 "Society/Industry/Home Industry System: Chemical Substance Total Management Supporting System," issued by Hitachi Hyoronsha on Jan. 1, 2000, 1 p. (in Japanese).

"Catalogue on Hitachi Chemical Substance Total Management Supporting System," issued on Jun. of 1999, 4 pp. (in Japanese).

Patent Abstracts of Japan, vol. 1995, No. 8, Sep. 29, 1995, abstract of JP 07 121588 A, May 12, 1995, Hitoshi (in English).

Patent Abstracts of Japan, vol. 2000, No. 4, Aug. 31, 2000, abstract of JP 2000-029900, Jan. 28, 2000, Masafumi (in English).

* cited by examiner

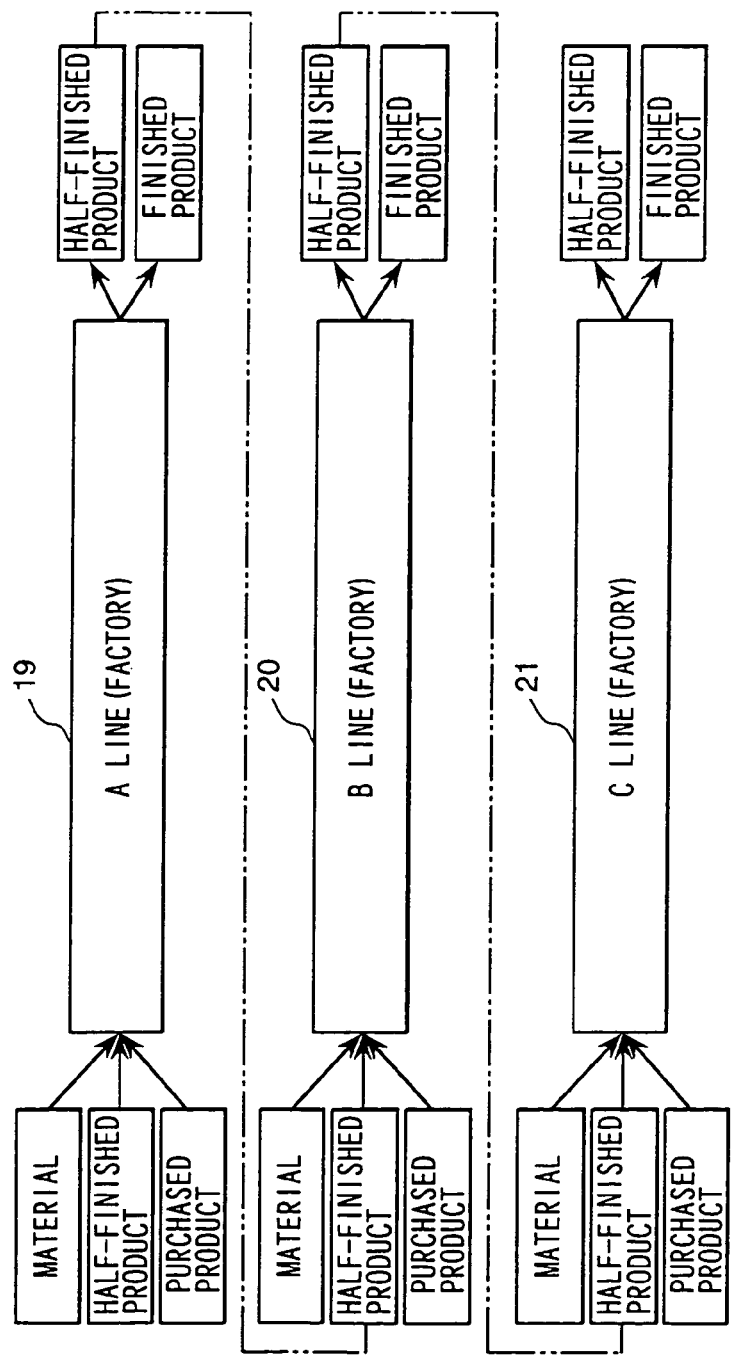

FIG. 7

| | INPUT | OUTPUT |
|---|---|---|
| 1 MATERIAL MAKER | INFORMATION RELATING TO PURCHASED PRODUCT | INFORMATION ON FINISHED MATERIAL PRODUCT ATMOSPHERE RELEASE INFORMATION BY MAKER WATER RELEASE INFORMATION BY MAKER WASTE INFORMATION BY MAKER |
| 2 PROCESSED MATERIAL MAKER | INFORMATION RELATING TO PURCHASED PRODUCT | INFORMATION ON FINISHED PROCESSED PRODUCT ATMOSPHERE RELEASE INFORMATION BY MAKER WATER RELEASE INFORMATION BY MAKER WASTE INFORMATION BY MAKER |
| 3 ASSEMBLY MAKER | INFORMATION RELATING TO PURCHASED PRODUCT | INFORMATION ON ASSEMBLED PRODUCT ATMOSPHERE RELEASE INFORMATION BY MAKER WATER RELEASE INFORMATION BY MAKER WASTE INFORMATION BY MAKER |
| 4 DISTRIBUTOR | — | ATMOSPHERE RELEASE INFORMATION BY DISTRIBUTOR |
| 5 RETAIL SHOP | — | — |
| 6 CONSUMER | — | — |
| 7 WASTE DISPOSER | — | ATMOSPHERE RELEASE INFORMATION BY DISPOSER WATER RELEASE INFORMATION BY DISPOSER WASTE INFORMATION BY DISPOSER |
| 8 RECYCLING BUSINESS ENTITY | — | ATMOSPHERE RELEASE INFORMATION BY DISPOSER WATER RELEASE INFORMATION BY DISPOSER WASTE INFORMATION BY DISPOSER |

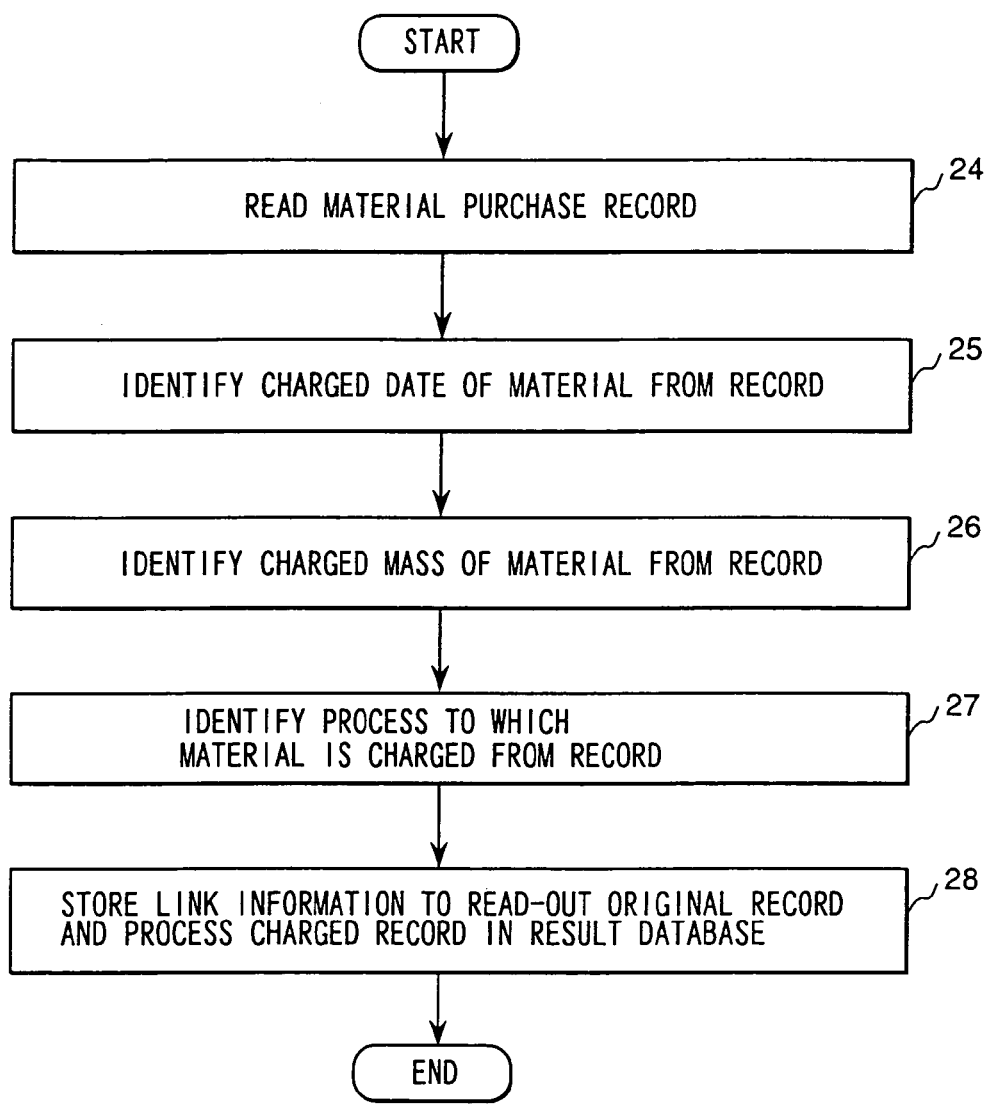

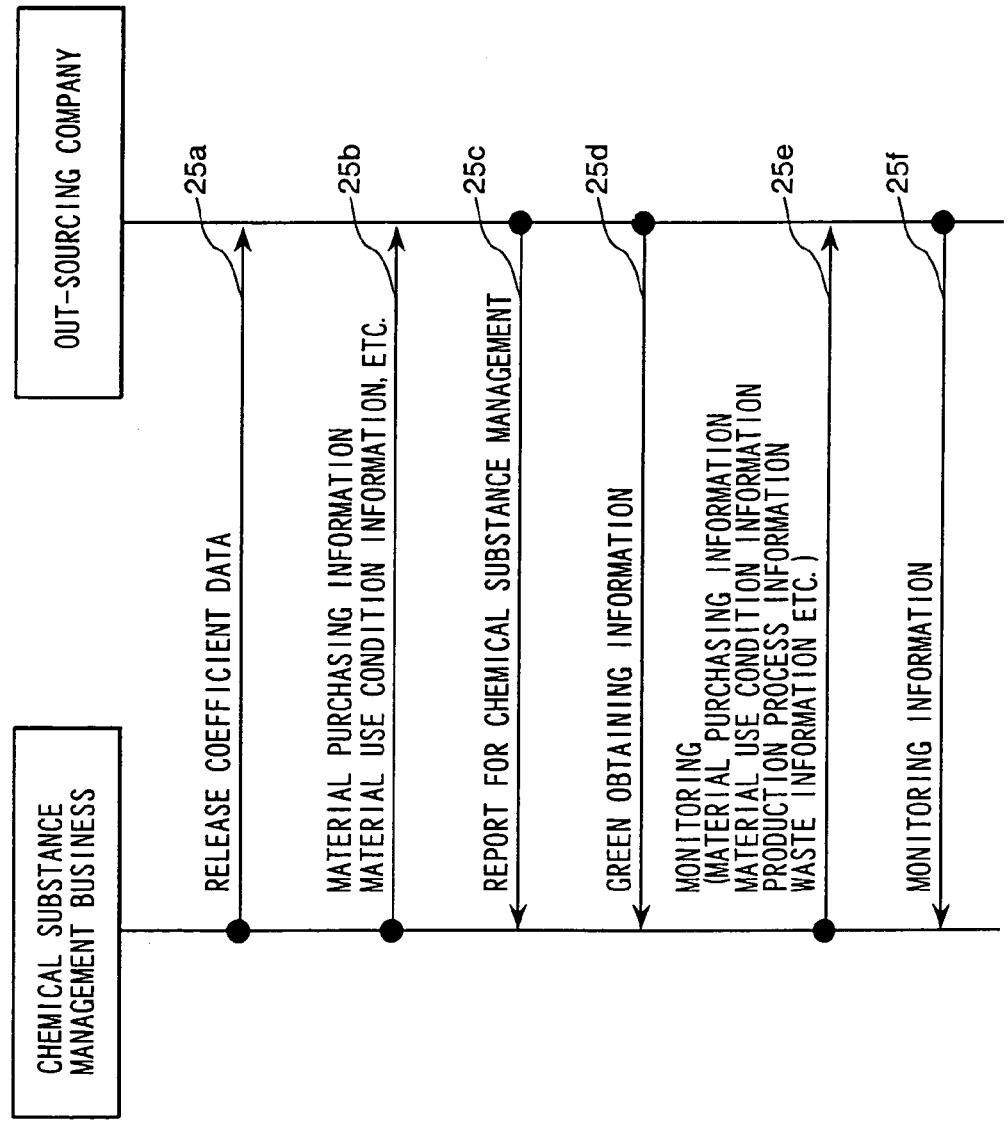

CHEMICAL MATERIAL INTEGRATED MANAGEMENT SYSTEM AND METHOD THEREOF

BACKGROUND OF THE INVENTION

The present invention relates to a chemical substance total management system and a chemical substance total management method for managing chemical substances contained in materials handled by business entities.

In various materials currently commercialized, several of hundreds kinds of chemical substances having significant impact to the environment are contained. When business entities handle the materials in the processes of manufacturing, transportation, storage and so forth, it has been required to know an amount of the chemical substances that is moved, an amount of chemical substance that is released to the atmosphere, soil and/or water, and an amount of chemical substance that has been provided to the market in a form contained in the products. Therefore, the business entities have to manage the chemical substances to be handled by themselves. Hereinafter, the chemical substances to be handled by the business entities will be referred to as "managing substance".

Therefore, legal system has been started to require the business entities to report quantative data of releasing and transferring the managing substances in factories, business offices or in business enterprise to the country and/or the autonomous body to estimate environmental impact of the overall country.

The conventional data collecting system has a function for inputting basic data of the managing substances per division and/or process and aggregately tabulating per unit of superior organization (business office, company). The reason is that as effective document, only this result is required.

Such prior art has been discussed in Special Edition, "Environmental Resource" of December, 1999.

For instance, it is assumed that 10 tons of xylene is released to the atmosphere as a result of aggregation in a business office. This value does not help in identification of process and in identification of material to be a cause of emission and thus does not contribute for reduction of release amount as final goal.

Also, mere aggregation of release amount of the management substance may not provide necessary data for risk communication which comes to attach importance thereto recently. In the risk communication, it is important to ease apprehension of residents concerning releasing of the managing substance. For this purpose, it is necessary to perform investigation into how the managing substance is released with identifying process and material and to have a communication with reference to feature of the process including height of the exhaust flue, security data of the material.

In aggregation of chemical substance management information, even when chemical substance information, namely composition information per product is obtained, the use amount used in own factory has to be analyzed into product depositing component, atmosphere releasing component, water releasing component, waste disposing component, soil releasing component and so forth. For this purpose, there is a task to manage managing substances, release amounts of respective managing substances, and release destinations of respective managing substances.

On the other hand, since it is unknown what substance will appear as managing substances, it is expected objective managing substances should be varied or modified from time to time. Namely, it is necessary to defend ourselves from danger of future contamination.

On the other hand, among information to be used in chemical substance management, there is a little information which can be judged by one business entity alone, there are information requiring versatile decision of country, autonomous bodies, specialized agencies and so forth, and information which the product manufacturer, material manufacturer has to make product information open. Namely, it is important to make these chemical substance management information common to interested parties.

On the other hand, considering flow of the products in the market, the products may flow in such a manner from material~raw material treatment~assembling process~transportation~sale~consumer~recycling business entity~waste disposal. The chemical substance management information has to also be circulated through the same route. Wide variety of business entities, e.g. large size company, middle size company, small size company, individual, autonomous body, are associated with the circulation cycle. Unless information is commonly owned by all parties associated with the circulation cycle, highly accurate chemical substance management cannot be realized.

Furthermore, each of the parties associated with the information circulation cycle has to perform highly accurate chemical substance management.

SUMMARY OF THE INVENTION

Therefore, it is a first object of the present invention to provide a chemical substance total management system and a chemical substance total management method which can easily manage amounts and release destination of managing substances.

The second object of the present invention is to provide a chemical substance total management system and a chemical substance total management method which can make chemical substance management information common for relevant parties.

The third object of the present invention is to provide a chemical substance total management method which can provide management business for business entities which are required to provide management of chemical substance.

According to the first aspect of the invention, a chemical substance total management system includes a material composition database of component composition information of material or product in a form of database;

a managing substance database in a form of a list of substance requiring management;

for identifying substances constituting the material or product on the basis of the material composition database and identifying substance required management on the basis of the managing substance database for managing chemical substance contained in the material handled by a business entity or product, wherein the system further comprises release coefficient database storing weight ratio data in each transfer and release destination per the identified management required substance in a form of database.

According to the second aspect of the invention, a chemical substance total management system includes a material composition database of component composition information of material or product in a form of database;

a managing substance database in a form of a list of substance requiring management;

a MSDS database storing product safety information sheet (MSDS), such as notations and the like in handling material in a form of database, for identifying substances constituting the material to be charged in manufacturing step or product on the basis of the material composition database and identifying substance required management on the basis of the managing substance database and the MSDS database for managing chemical substance contained in the material handled by a business entity or product, wherein the system further comprises release coefficient database storing weight ratio data in each transfer and release destination per the identified management required substance in a form of database.

According to the third aspect of the invention, a chemical substance total management system includes a material composition database of component composition information of material or product produced by at least one manufacturer in a form of database;

a managing substance database in a form of a list of substance requires management by government or public office, the material composition database and the managing substance database being accessible through a wide area network, and information of each of the database being provided for business entity required management of chemical substance.

According to the fourth aspect of the present invention, a chemical substance total management system includes a material composition database of component composition information of material or product produced by at least one manufacturer in a form of database;

a managing substance database in a form of a list of substance requires management by government or public office, a MSDS database storing product safety information sheet (MSDS), such as notations and the like in handling material in a form of database, the material composition database, the managing substance database and the MSDS database being accessible through a wide area network, and information of each of the database being provided for business entity required management of chemical substance.

According to the fifth aspect of the present invention, a chemical substance total management method includes a material composition database of component composition information of material or product in a form of database;

a managing substance database in a form of a list of substance requiring management;

for identifying substances constituting the material or product on the basis of the material composition database and identifying substance required management on the basis of the managing substance database for managing chemical substance contained in the material handled by a business entity or product, wherein the method further comprises calculating a release and transfer amount in release and transfer destination per substance identified on the basis of weight ratio data of substance in each transfer and release destination per the identified management required substance in a form of database.

According to the sixth aspect of the present invention, a chemical substance total management method includes a material composition database of component composition information of material or product in a form of database;

a managing substance database in a form of a list of substance requiring management;

a MSDS database storing product safety information sheet (MSDS), such as notations and the like in handling material in a form of database, for identifying substances constituting the material to be charged in manufacturing step or product on the basis of the material composition database and identifying substance required management on the basis of the managing substance database and the MSDS database for managing chemical substance contained in the material handled by a business entity or product, wherein the method further comprises calculating a release and transfer amount in release and transfer destination per substance identified on the basis of weight ratio data of substance in each transfer and release destination per the identified management required substance in a form of database.

According to the seventh aspect of the present invention, a chemical substance total management method includes a material composition database of component composition information of material or product produced by at least one manufacturer in a form of database;

a managing substance database in a form of a list of substance requires management by government or public office, the material composition database and the managing substance database being accessible through a wide area network, and information of each of the database being provided for business entity required management of chemical substance.

According to the eighth aspect of the present invention, a chemical substance total management method includes a material composition database of component composition information of material or product produced by at least one manufacturer in a form of database;

a managing substance database in a form of a list of substance requires management by government or public office, a MSDS database storing product safety information sheet (MSDS), such as notations and the like in handling material in a form of database, the material composition database, the managing substance database and the MSDS database being accessible through a wide area network, and information of each of the database being provided for business entity required management of chemical substance.

According to the ninth aspect of the present invention, a chemical substance total management method includes a material composition database of component composition information of material or product produced by at least one manufacturer in a form of database;

a managing substance database in a form of a list of substance requires management by government or public office, identifying substances constituting the material to be charged in manufacturing step or product on the basis of the material composition database, identifying substance required management on the basis of the managing substance database contained in the material handled by a business entity or product, concentrically managing the material composition database, and providing information of the material composition database for the business entity.

According to the tenth aspect of the present invention, a chemical substance total management method includes a material composition database of component composition information of material or product produced by at least one manufacturer in a form of database;

a managing substance database in a form of a list of substance requires management by government or public office, a MSDS database storing product safety information sheet (MSDS), such as notations and the like in handling material in a form of database, identifying substances constituting the material to be charged in manufacturing step or product on the basis of the material composition database, identifying substance required management on the basis of the managing substance database and the MSDS database for managing chemical substance contained in the material handled by a business entity or product, concentrically managing the material composition database, and providing information of the material composition database for the business entity.

According to the eleventh aspect of the present invention, a chemical substance total management system includes identifying substance requiring management on the basis of a material composition database of component composition information of material or product produced by at least one manufacturer in a form of database and a managing substance database in a form of a list of substance requires management by government or public office, managing chemical substance contained in the material handled by business entity or product in response to request of the business entity.

According to the twelfth aspect of the present invention, a chemical substance total management method includes identifying substance requiring management on the basis of a material composition database of component composition information of material or product produced by at least one manufacturer in a form of database, a managing substance database in a form of a list of substance requires management by government or public office and a MSDS database storing product safety information sheet (MSDS), such as notations and the like in handling material in a form of database, managing chemical substance contained in the material handled by business entity or product in response to request of the business entity.

According to the thirteenth aspect of the present invention, a chemical substance total management method includes identifying substance requiring management on the basis of a material composition database of component composition information of material or product produced by at least one manufacturer in a form of database and a managing substance database in a form of a list of substance requires management by government or public office, preparing a report concerning chemical substance contained in the material to be handled by business entity or product for submitting government or public office for the business entity.

According to the fourteenth aspect of the present invention, a chemical substance total management method includes identifying substance requiring management on the basis of a material composition database of component composition information of material or product produced by at least one manufacturer in a form of database, a managing substance database in a form of a list of substance requires management by government or public office and a MSDS database storing product safety information sheet (MSDS), such as notations and the like in handling material in a form of database, preparing a report concerning chemical substance contained in the material to be handled by business entity or product for submitting government or public office for the business entity.

According to the fifteenth aspect of the present invention, a chemical substance total management method includes a material composition database of component composition information of material or product produced by at least one manufacturer in a form of database;

a managing substance database in a form of a list of substance requires management by government or public office, release coefficient database storing weight ratio data in each transfer and release destination per the identified management required substance in a form of database identifying substances constituting the material to be charged in manufacturing step or product on the basis of the material composition database, identifying substance required management on the basis of the managing substance database contained in the material handled by a business entity or product, deriving transfer amount of substance requiring management in release and transfer destination on the basis of the release coefficient database, managing chemical substance contained in the material handled by business entity or product in response to request of the business entity.

According to the sixteenth aspect of the present invention, a chemical substance total management method includes a material composition database of component composition information of material or product produced by at least one manufacturer in a form of database;

a managing substance database in a form of a list of substance requires management by government or public office, a MSDS database storing product safety information sheet (MSDS), such as notations and the like in handling material in a form of database, identifying substances constituting the material to be charged in manufacturing step or product on the basis of the material composition database, identifying substance required management on the basis of at least one of the managing substance database and the MSDS database for managing chemical substance contained in the material handled by a business entity or product, deriving transfer amount of substance requiring management in release and transfer destination on the basis of the release coefficient database, managing chemical substance contained in the material handled by business entity or product in response to request of the business entity.

According to the seventeenth aspect of the present invention, a chemical substance total management method includes a material composition database of component composition information of material or product produced by at least one manufacturer in a form of database;

a managing substance database in a form of a list of substance required management, release coefficient database storing weight ratio data in each transfer and release destination per the identified management required substance as release coefficient data of business entity, identifying substances constituting the material to be charged in manufacturing step or product on the basis of the material composition database, identifying substance required management on the basis of the managing substance database, deriving transfer amount of substance requiring management in release and transfer destination on the basis of the release coefficient database, managing chemical substance contained in the material handled by business entity or product in response to request of the business entity.

According to the eighteenth aspect of the present invention, a chemical substance total management method includes a material composition database of component composition information of material or product produced by at least one manufacturer in a form of database;

a managing substance database in a form of a list of substance requires management by government or public office, a MSDS database storing product safety information sheet (MSDS), such as notations and the like in handling material in a form of database, release coefficient database storing weight ratio data in each transfer and release destination per the identified management required substance as release coefficient data of business entity, identifying substances constituting the material to be charged in manufacturing step or product on the basis of the material composition database, identifying substance required management on the basis of at least one of the managing substance database and the MSDS database, deriving transfer amount of substance requiring management in release and transfer destination on the basis of the release coefficient database, managing chemical substance contained in the material handled by business entity or product in response to request of the business entity.

Management of chemical substance contained in the material to be handled by the business entity or the product may be performed on the basis of the weight ratio data of the substance in the release and transfer destination per substance identified as required management.

The report to be submitted to the government or public office in connection with the chemical substance contained in the material to be handled by the business entity or product may be prepared on the basis of the weight ratio data of the substance in the release and transfer destination per substance identified as required management.

Management of chemical substance contained in the material to be handled by the business entity or product may be performed on the basis of fee under agreement with the business entity.

Preparation of report to be submitted to government or public office in connection with chemical substance contained in the material to be handled by the business entity or product may be performed on the basis of fee under agreement with the business entity.

Management of chemical substance contained in the material to be handled by the business entity or product may include preparation of report to be submitted to government or public office in connection with chemical substance contained in the material to be handled by the business entity or product.

BRIEF DESCRIPTION OF THE DRAWINGS

The present invention will be understood more fully from the detailed description given hereinafter and from the accompanying drawings of the preferred embodiment of the present invention, which, however, should not be taken as a limitation on the invention, but are for explanation and understanding only.

In the drawings:

FIG. 6 is a conceptual illustration showing flow of material, semi-finished product and purchased product in a manufacturing line;

FIG. 7 is a conceptual illustration showing an aggregate of substance management information per business entry in each step;

FIG. 8 is a flowchart showing a data input process in one embodiment of the chemical substance total management system according to the present invention;

FIG. 27 is an illustration showing exchange of information between the chemical substance management company and the out-sourcing company.

DETAILED DESCRIPTION OF THE PREFERRED EMBODIMENTS

The present invention will be discussed hereinafter in detail in terms of the preferred embodiment of a chemical substance total management system, a storage medium storing a chemical substance total management program and a chemical substance total management method according to the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structure is not shown in detail in order to avoid unnecessary obscurity of the present invention.

Incorporate by Reference

Whole disclosure of co-pending U.S. patent application Ser. No. 09/793,240 (pending) for "CHEMICAL SUBSTANCE TOTAL MANAGEMENT SYSTEM, STORAGE MEDIUM STORING CHEMICAL SUBSTANCE MANAGEMENT PROGRAM AND CHEMICAL SUBSTANCE TOTAL MANAGEMENT METHOD" filed with claiming convention priority based on Japanese Patent Application No. 2000-55960, filed on Feb. 28, 2000, is herein incorporated by reference.

Figure 1:
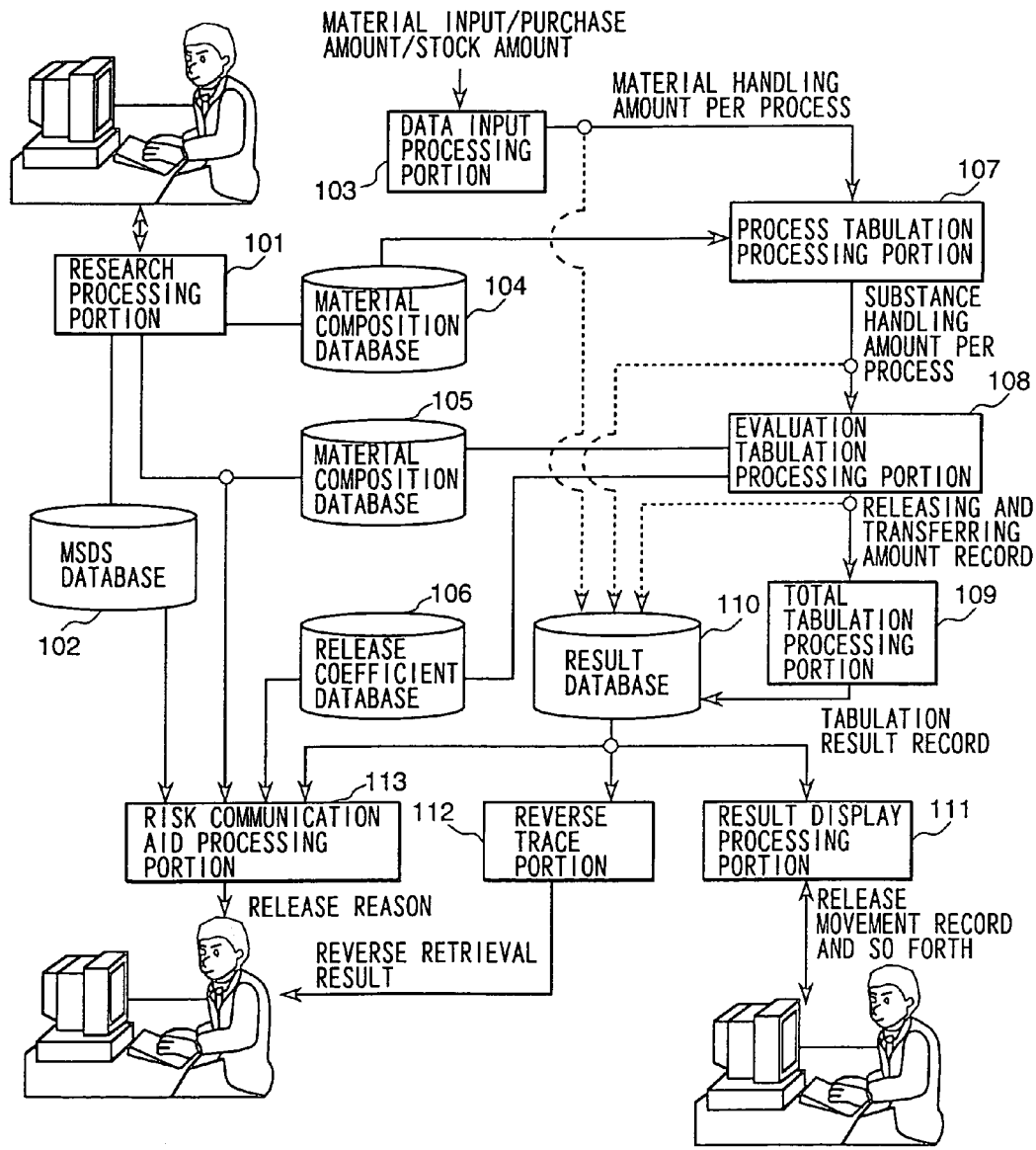
FIG. 1 is a block diagram showing a construction of one embodiment of a chemical substance total management system according to the present invention.

FIG. 1 shows the overall construction of an embodiment of a chemical substance total management system according to the present invention. The shown embodiment of the chemical substance total management system performs tabulation and management on the basis of information established as various kinds of database starting from inputting of material charge amount, purchase amount and stocking amount.

The chemical substance total management system includes a research processing portion 101, a MSDS database 102, a data input processing portion 103, a material composition database 104, a managing substance database 105, a release coefficient database 106, a process tabulation processing portion 107, a evaluation tabulation processing portion 1042 total tabulation processing portion 109, a result database 110, a result display processing portion 111, a retrieval processing portion 112 and a risk communication aid processing portion 113.

The MSDS database 102 stores items of notations or data in handling of materials, product safety data sheet (MSDS) indicative of harmful effect, correspondence to laws and rules in a form of database per material. The material herewith referred to includes a raw material to charge stock of completed product (e.g. rough substance, such as ore, crude oil and so forth, primary processed product, such as steel plate or the like, half-finished product, such as substrate or the like), one used for production of complete products (e.g. coating agent, cleaning agent, paint, cooling agent). The complete products herewith referred to are products which are shipped by the business entities, such as automobile, camera, personal computer, film, television set, CPU, plate member, cable, clothes, foods, building, electric power, water and so forth.

The material composition database 104 stores material composition information in a form of database.

One material normally consists of a plurality of substances, namely molecules. For the substances (molecules), CAS (Chemical Abstract Services) number and other identifier are present. Therefore, a record of material composition database 104 preferably consists of a material name, an identifier of managing substance contained in the material (for example, name of managing substance, CAS number of the managing substance or the like), lower limit and upper limit of content of managing substance (preferably, mass rate) in a form of field. Managing substances herewith referred to are substances requiring management as substances significantly affecting for environment or its peripheral substance as chemical substance (first-class designated chemical substance) taken as object in PRTR law (law relating to keep track release amount of particular chemical substance to environment and promoting improvement of management: Pollutant Release and Transfer Register law") or chemical substances to be object in chemical substance management guideline or environment protection guideline or the like of state or GDM (Government-Designated Municipalities). For example, the managing substances herewith referred to may be toluene, xylen acid, methyl isobutyl ketone (MIBK), isopropanol, chromate salt, epoxy resins, methylene chloride, benzene, dimethyl zinc, acrylamide, mercury, vinyl chloride or the like.

The managing substance database 105 is a database listing of the managing substances and stores record group taking arbitrary genre (poisonous substance, deleterious substance, managing object, law and regulation defined substance, self-management substance and so forth) and identifier of corresponding managing substance as field. The managing substance database 105 also stores record group taking the identifier of the managing substance and physical property as field. As the physical property, a coefficient in the case of converting the molecular weight into a pure metal mass weight, vapor pressure, density and so forth are included.

These substances may contain designated substances defined in "Law Relating To Keep Track Release Amount Of Particular Chemical Substance To Environment And Promoting Improvement Of Management: Pollutant Release and Transfer Register law" (Law No. 86, issued on Jul. 13, 1999)

A release coefficient database 106 stores records taking managing substances per releasing destination (atmosphere, water, soil, consumption, charged disposal, recycling, containment in product) and releasing and transferring amount of the managing substance (preferably ratio by weight). Process herewith referred to is production process of product by the business entity, inspection process of the product, development process of the product, and includes molding process, processing process, heat treatment process, painting process, washing process, etching process, surface treatment process, assembling process and so forth. For example, it is data representing release of 80% of toluene as component of paint A to atmosphere relation to charging of the pain A in certain painting process in the production line in certain division.

The research processing portion 101 has a function for retrieval of field mutually common from record group stored in the MSDS database 102, the material composition database 104, the managing substance database 105, the discharge coefficient database 106 with establishing association, retrieval with identifier, such as name of managing substance, CAS number or the like, retrieval of record in partial matching with respect to texts in the field for outputting as screen image or file. A result database 110 stores records used by respective means of the shown system and records generated as a result and also stores correspondence information thereof. The result display processing portion 111 retrieves the content of the result database 110, reads out and displays various tabulation results.

Figure 2:
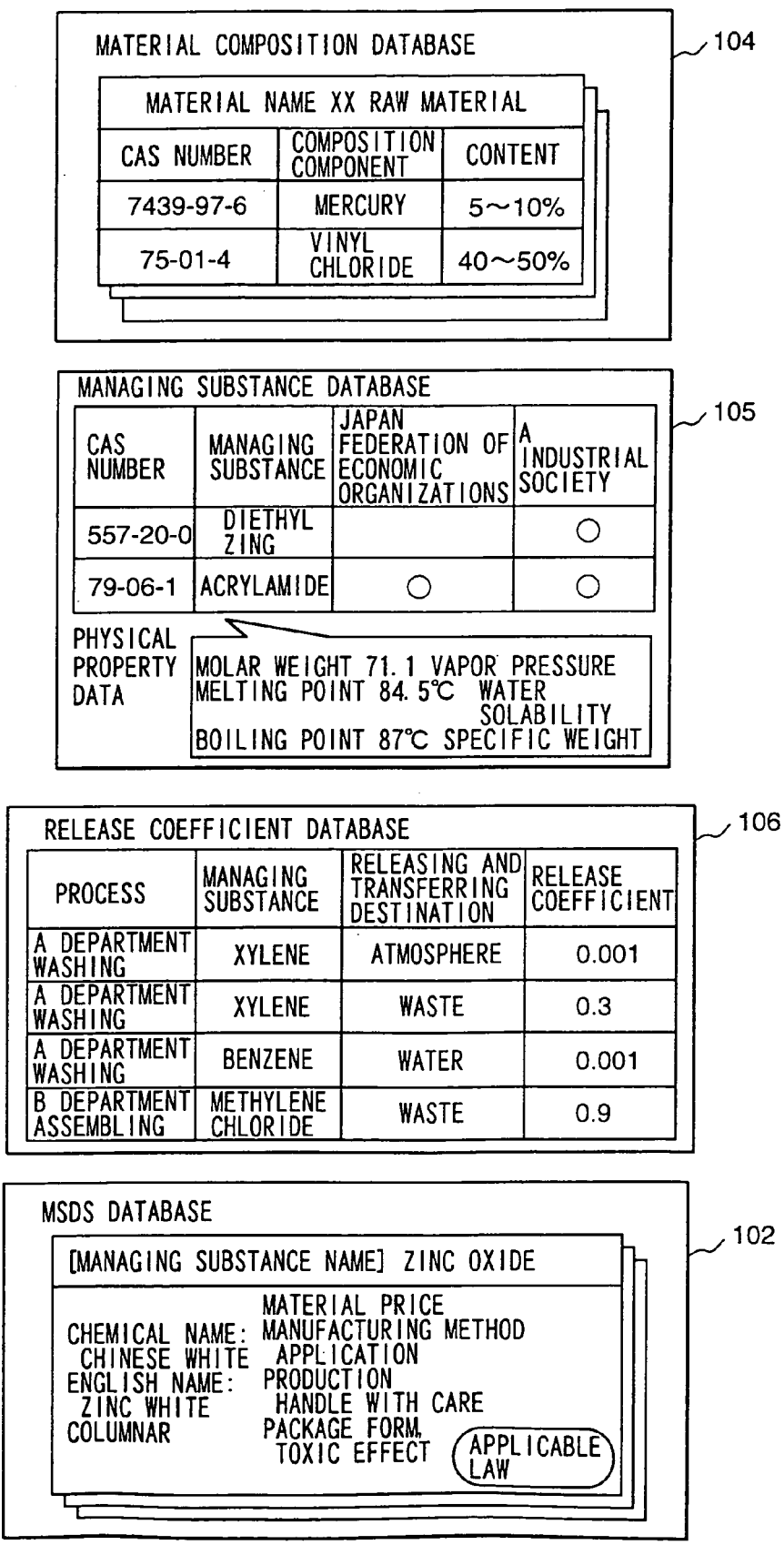
FIG. 2 is a conceptual illustration showing an example of a data structure of a database in one embodiment of the chemical substance total management system according to the present invention.

FIG. 2 shows an example of data structure of the database in the shown embodiment of the present invention. In the material composition database 104, data establishing correspondence between identifier of material composition, such as the CAS number of the managing substance contained in the material, name of substance of the material composition and upper limit and lower limit of the content of the managing substance is stored per material with taking the material as key index. As material name, tradename or product number upon purchased by the business entity may be used. However, any identification uniquely determined code system may be used.

The managing substance database 105 stores substance name, information concerning which party designated the substance as managing substance and physical property data with taking the identifier of the substance, such as CAS number or the like, as key index.

The release coefficient database 106 stores coefficients indicative of charged substance, releasing destination, releasing ratio for the mass weight of the charged substance with taking the name of the process of business entity as key index.

The MSDS database 102 stores notations in handling the managing substance, toxic effect, applicable law and regulation and so forth is stored with taking the substance name as key index.

Figure 3:
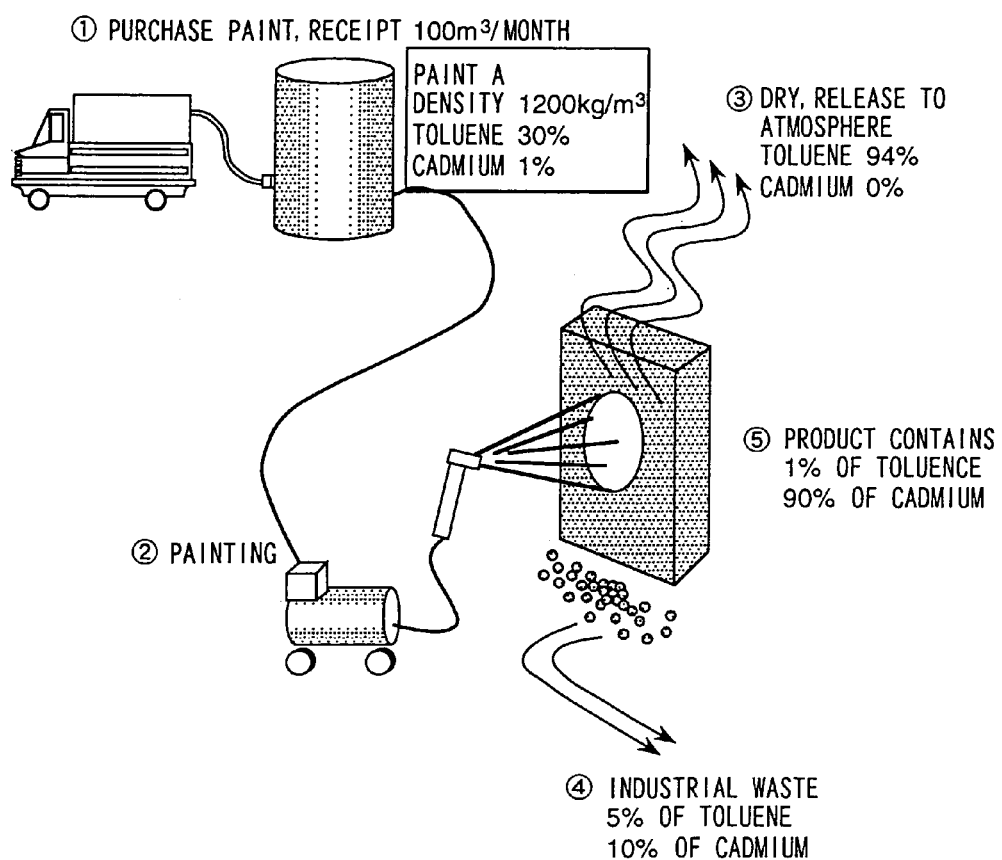
FIG. 3 is a conceptual illustration showing an example of handling of managing substances in one embodiment of the chemical substance total management system according to the present invention.

FIG. 3 shows an example of handling of the managing substance in the shown embodiment of the present invention. Discussion will be given in order of numbers given in FIG. 3.

The shown example is started in purchasing the paint A as material (procedure 1). A purchase amount of the paint A is 100 m3/month, a storage amount in a tank is typically constant. Therefore, a handling amount in the process is premised as 100 m3/month, similarly. AS density of the paint A is 1200 kg/m3, handling amount thereof is 120000 kg/month. All amount of the paint A is put into a painting process (procedure 2). Process up to here is implemented by the data input processing portion 103.

Next, it can be read out the material composition database 104 that the paint A contains 30% of toluene and 1% of cadmium. Therefore, a handling amount of the managing substance in the paining process is derived as 36000 kg/month of toluene and 1200 kg/month of cadmium. This calculation is performed by the process tabulation processing portion 107.

Next, in the paining process, painting for the shipping product is performed for applying the paint by spray is performed. During this process, a part of the paint is dried and released to the atmosphere (procedure 3). Releasing rate to the atmosphere of 94% of toluene and 0% of cadmium can be read from the discharge coefficient database 106. Therefore, it can be evaluated that 33840 kg of toluene is released to the atmosphere every month. Similarly, as industrial waste (procedure 4), 1800 kg of toluene and 120 kg of cadmium are disposed per month. It is also evaluated that 360 kg of toluene and 1080 kg of cadmium are contained in the shipping product. These evaluations are implemented by the evaluation tabulation processing portion 108.

Figure 4:
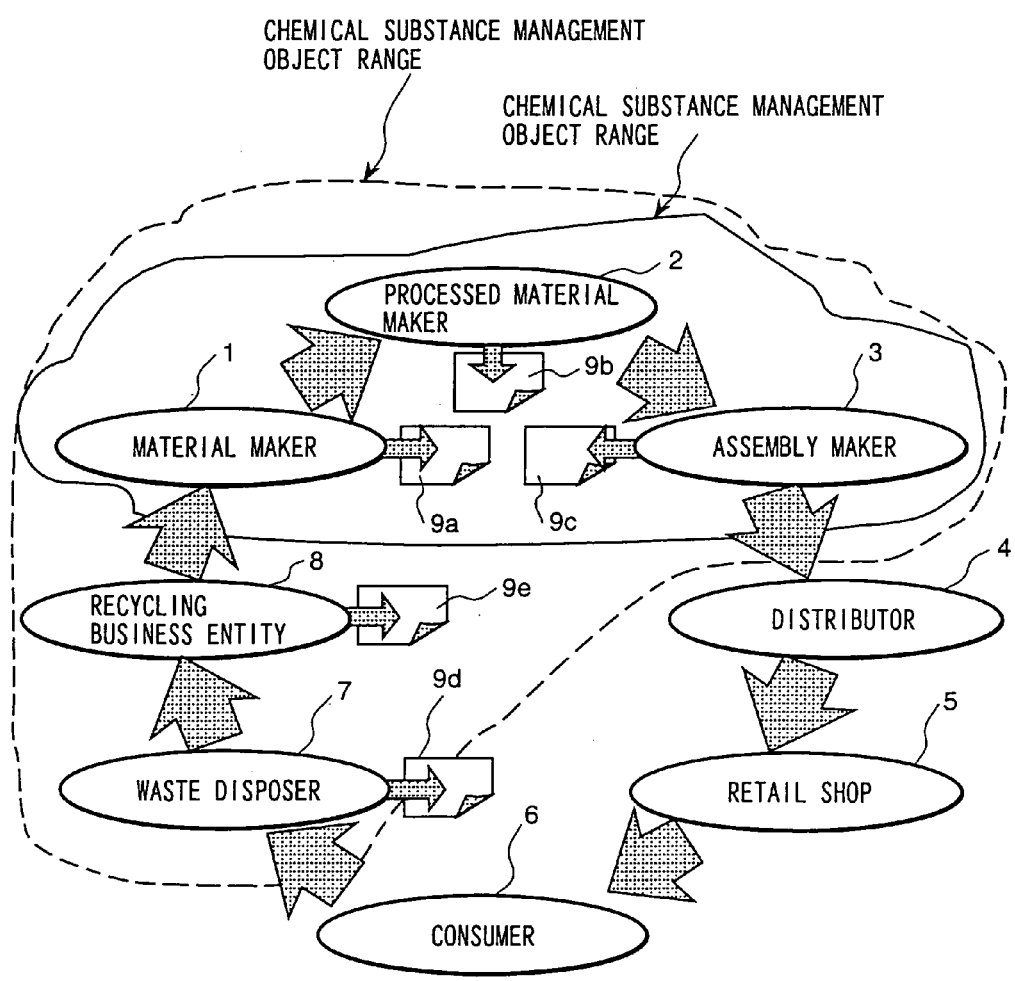
FIG. 4 is a conceptual illustration of example of handling of managing substance in the shown embodiment of the present invention.

FIG. 4 shows a relationship between flow of products circulated in the market and the chemical substance management. The product in the market circulates from a material maker 1~raw material treatment maker 2~assembly maker 3~transporting business entity 4~retail store 5~consumer 6~waste disposing business entity 7~recycling business entity 8. Then, the flow returns to the material maker to repeat the process again. For example, assuming that objective range of the chemical substance management is the range shown by dotted line, the material maker 1, the raw material treatment maker 2, the assembly maker 3. the waste disposing business entity 7 are involved as objective business entities under "Law Relating To Keep Track Release Amount Of Particular Chemical Substance To Environment And Promoting Improvement Of Management: Pollutant Release and Transfer Register law".

As can be seen from FIG. 4, transfer of the product per se from preceding step (business entity) to succeeding step (business entity) of the product, requires transfer of chemical substance management information contained in the product from the preceding step (business entity) to the succeeding step (business entity) in order to establish chemical substance management over the whole society.

Figure 5:
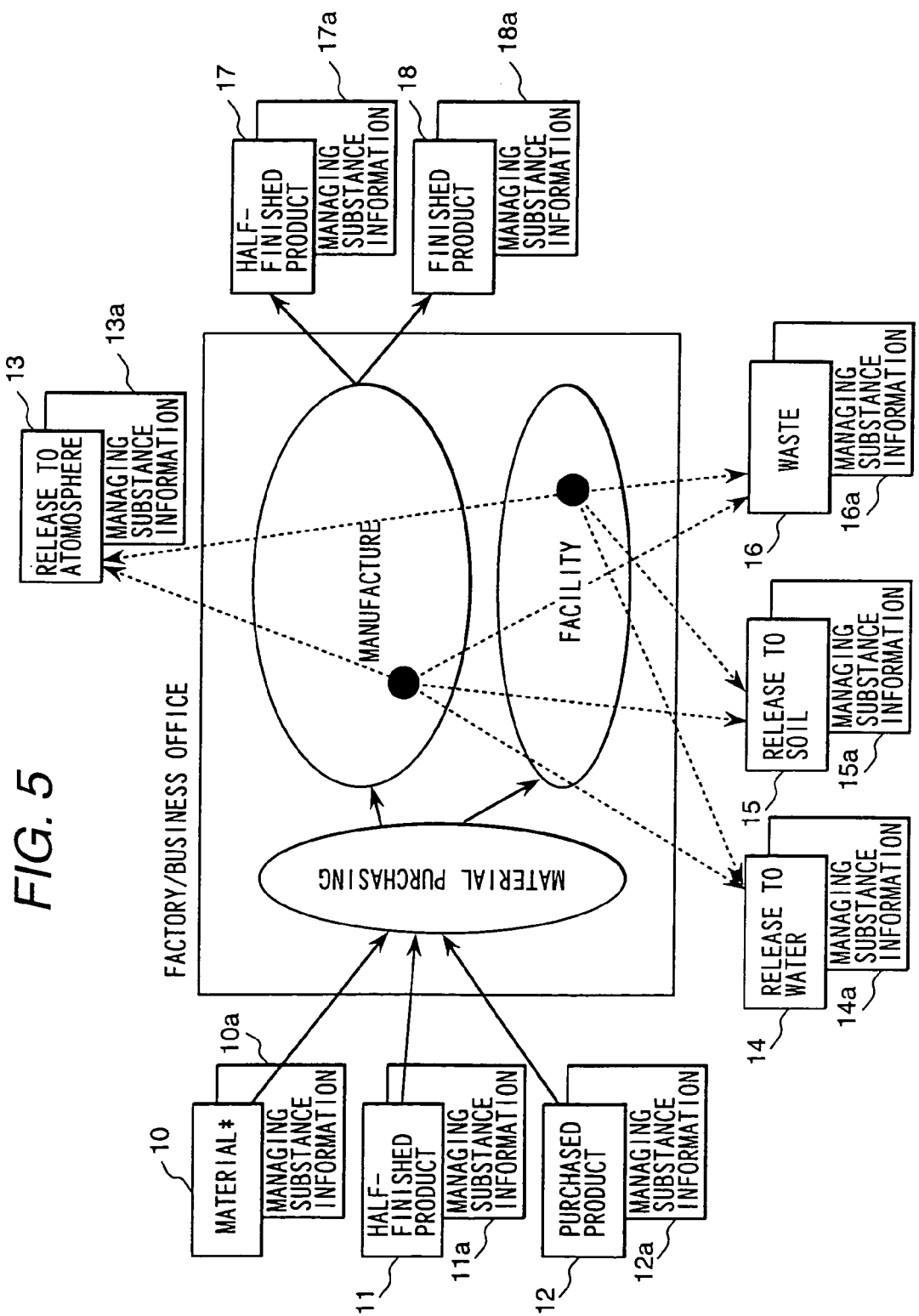
FIG. 5 is a conceptual illustration developed in FIG. 4 in business entity level.

FIG. 5 shows development of FIG. 4 in business entity level. In the business entity level, factories or business offices are included. It is assumed that division stocking material, division having facility, division performing manufacturing are present in the factory or the business office. Here, the facility has plants for producing hot water, vapor, compressed air, low temperature and so forth for supplying to the factory or the business office.

In the division stocking material, material 10, semi-finished product 11 and purchased product 12 are stocked. For respective of the material 10, the semi-finished product 11 and the purchased product 12, managing substance information 10a, 11a and 12a are present.

On the other hand, in the division performing manufacturing, the managing substance is released to the atmosphere as indicated by reference numeral 13, to water as indicated by reference numeral 14, or to the soil as indicated by reference numeral 15. Also, some of the managing substance is disposed as waste as indicated by reference numeral 16. For the substance released to the atmosphere 13, to the water 14 and to the soil 15, managing substance information 13a, 14a and 15a are present. Also, even for the waste 16, the managing substance information 16a is present. Then, the division performing manufacturing performs production of the semi-finished product 17 or finished product even for such semi-finished product 17 or the finished product 18, managing substance information 17a and 142 are present.

Similarly, in the facility, the managing substance may be released to the atmosphere 13, to the water 14 or to the soil 15, or be disposed as waste 16. Even for these, managing substance information 13a, 14a and 15a are present.

FIG. 6 shows a production line in the manufacturing division in FIG. 5. For example, in A line (step), the semi-finished product or finished product is produced from the material, semi-finished product or purchased product. Then, managing substance information of respective of the material, the semi-finished product, purchased product, the finished product, respectively. The same is true even for B line (step) 20, C line (step) 21.

As can be appreciated from FIGS. 5 and 6, in the business entity, for example, in the factory or business office, it should be appreciated that transfer or share of managing substance information in the objective range, such as between workplaces, process steps and so forth.

FIG. 7 shows an aggregate of substance management information in each business entity in the preceding step (business entity) to succeeding step (business entity) of the product. Information in-coming to the business entity (input) 22 and information out-going from the business entity (output) 23 of the material maker 1, the raw material treatment maker 2, the assembly maker 3, the transporting business entity 4, the retail store 5, the consumer 6, the waste disposing business entity 7 and recycling business entity are shown separately. Unless the substance management information is transferred from the preceding step (business entity) to succeeding step (business entity), chemical substance management over the whole society cannot be established.

FIG. 8 is a flowchart showing data input process for realizing the data input portion 103 in the shown embodiment of the present invention.

In the data input processing portion 103, a data input process is performed. The data input process includes a reading process 24, a date identification process 25, a mass weight identification process 26, a process identification process 27 and a storing process 28.

In the data input portion 103, charging of the material and stocking of the material are read from the material management record, such as material stocking document, stock control document and so forth. Here, as one example, as the material management record, the stocking record of the material is read out (read process 24). From the record, the date is identified (date identifying process 25). Next, mass weight of the material is identified (mass weight identification process 26). Thereafter, using an orderer name or the like, process, in which the material is handled, is identified (process identification process 27). These series of result data are stored in the result data base 110 as process handling amount record (storing process 28). On the other hand, data input link information as link information correlating the material handling amount record as result record and the material management record as original record for obtaining the result record is also stored in the result database 110 (storing process 28).

The link information is information for correlation of the data record and the result record in the case where the data record (original data) preliminarily present in the processing portion (data input processing portion 103, process tabulation processing portion 107, evaluation tabulation processing portion 108, total tabulation processing portion 109) is read out, processed by information process, arithmetic process or tabulation process to generate new data record (result record). In case of a one-to-one relationship, correlation can be realized by adding point to one of two records. If both of the records are plural and N-to-N relationship is established, pointers to all of the result records are added to the original records, and pointers to all original records are added to the result records. In the alternative, relationship between the original records and the result records may be established in a form of a table.

Figure 9:
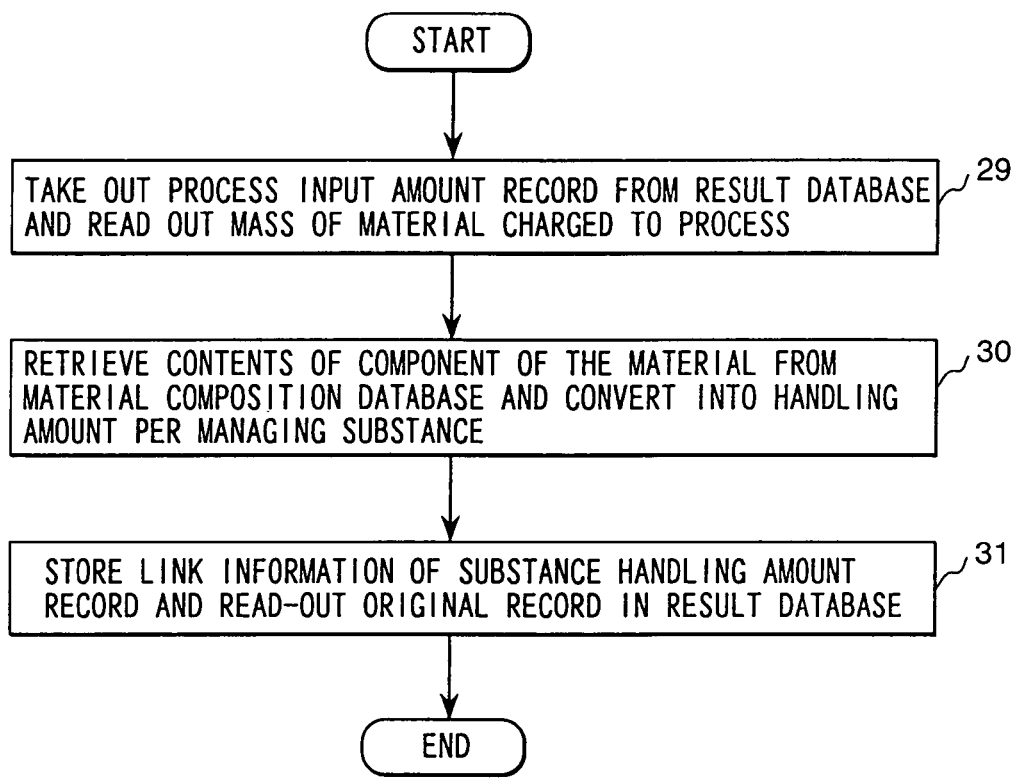
FIG. 9 is a flowchart showing a process tabulation process in one embodiment of the chemical substance total management system according to the present invention.

FIG. 9 is a flowchart showing a process tabulation process for implementing the tabulation processing portion 107 shown in the embodiment of FIG. 1.

In the process tabulation process portion 107, process tabulation process is performed. The process tabulation process includes a read out process 5a, a conversion process 5b and a storing process 5c.

At first, mass weight charged to the process is read out from the process tabulation process handling amount record stored in the result database 110 (read out process 29). Next, from the material composition data stored in the material composition database 104, the managing substance contained in the material is retrieved. Then, conversion is performed to convert into the handling amount per managing substance (conversion process 30). By managing the handling amount of the material in mass weight (kg) and managing the content of the managing substance contained in the material in percent by mass, the handling amount of the managing substance can be obtained in mass weight (kg) by multiplying the mass weight (kg) of the handling amount of the material by the content of the managing substance contained in the material. Finally, the process tabulation link information as the link information between the substance handling amount record as the result record and the process handling record and the material composition record as original record, is also stored in the result database 110 (storing process 31).

Figure 10:
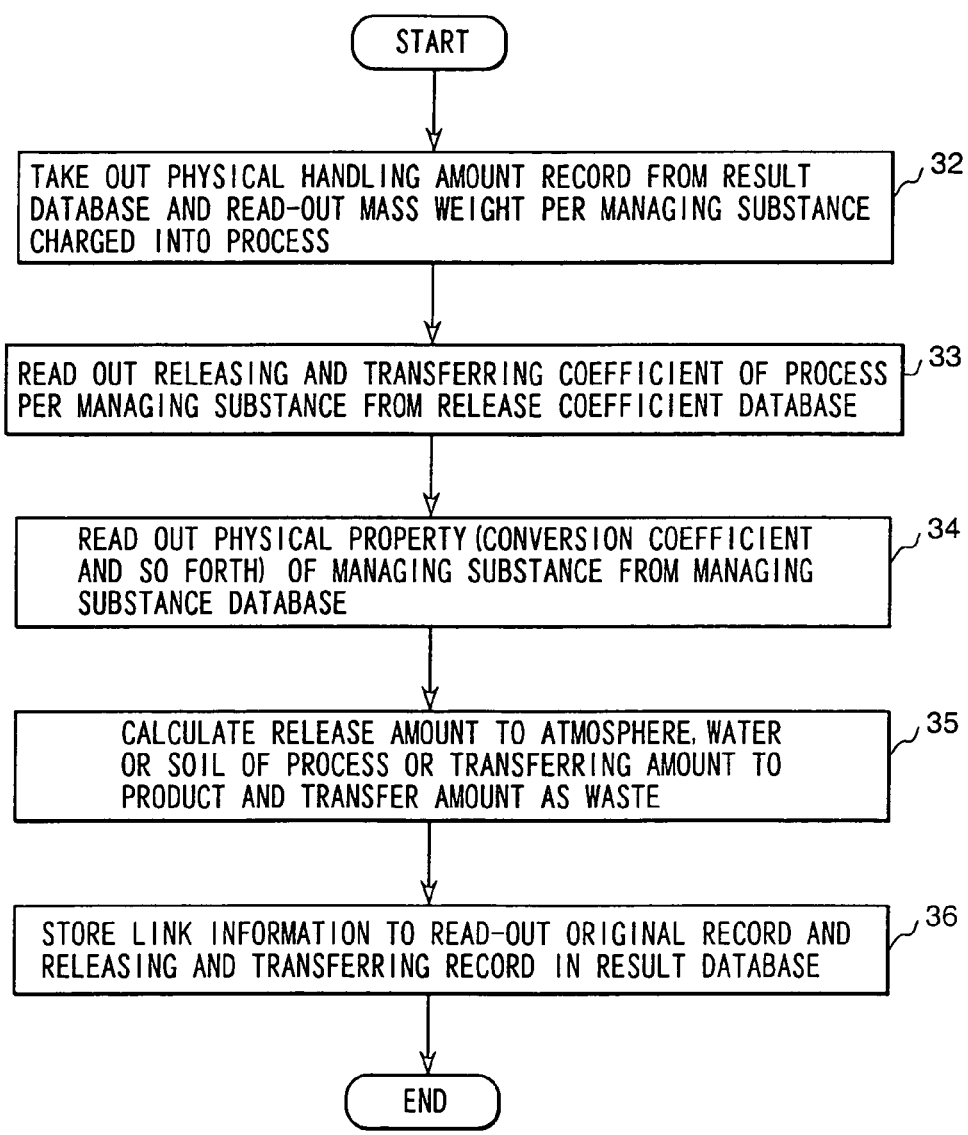
FIG. 10 is a flowchart showing an evaluation tabulation process in one embodiment of the chemical substance total management system according to the present invention.
Figure 11:
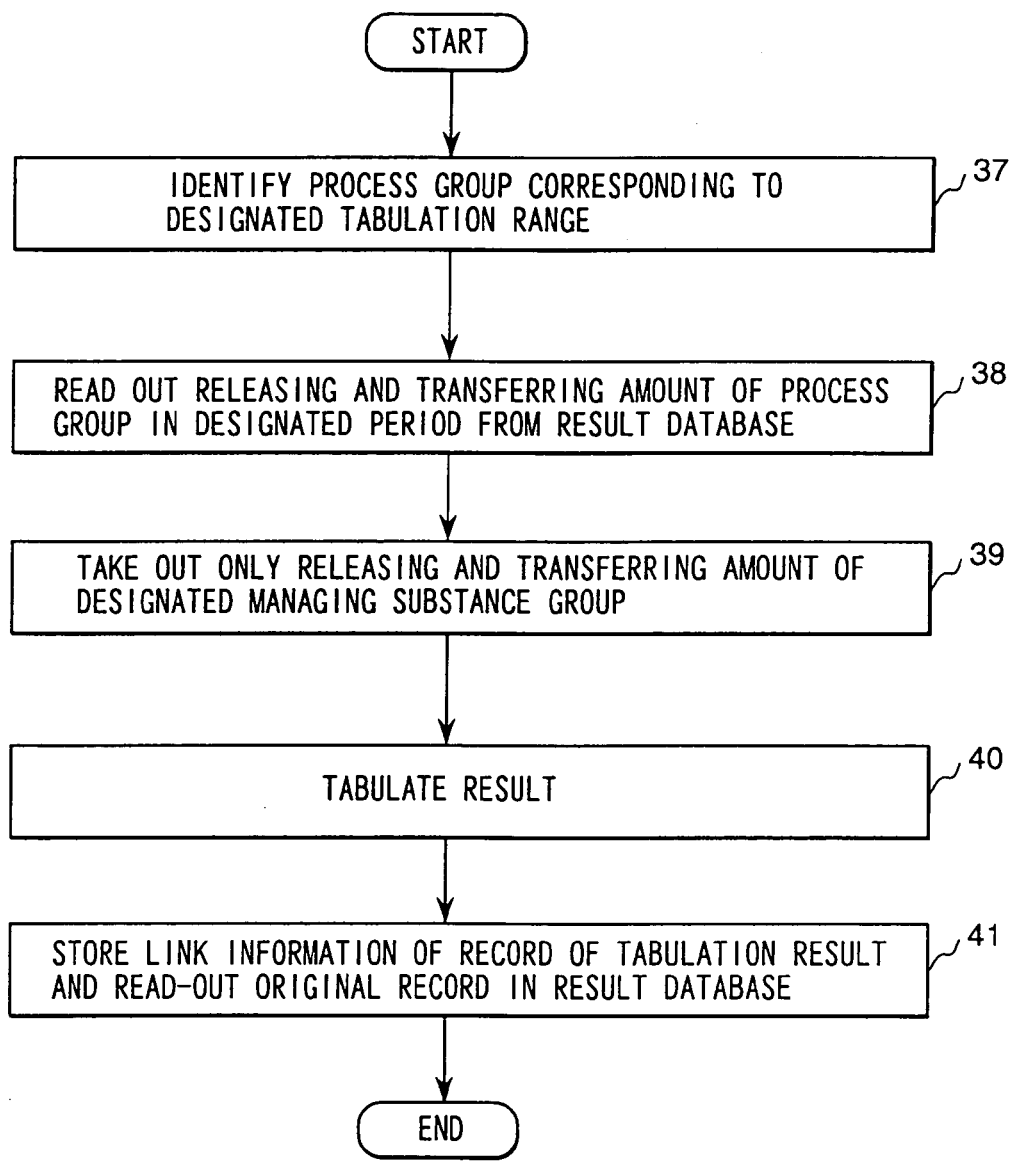
FIG. 11 is a flowchart showing a total tabulation process in one embodiment of the chemical substance total management system according to the present invention.

FIG. 10 is a flowchart of the evaluation tabulation process for implementing the evaluation tabulation processing portion 1050n shown in the embodiment of the present invention shown in FIG. 1.

In the evaluation tabulation processing portion 108 evaluation tabulation process is performed. The evaluation tabulation process includes a reading process 32, 33 and 34, a calculation process 35 and a storing process 36.

The mass weight per managing substance charged to the process from the substance handling amount record is stored in the result database 110 (read out process 32). Next, the releasing and transferring coefficient of the managing substance in the process is read out from the release coefficient data stored in the release coefficient database (read out process 33). The physical property of the managing substance (conversion coefficient and so forth) is read out from the managing substance data stored in the managing substance database 105 (read out process 34). Next, releasing amount of the managing data to atmosphere, water, or soil in the process, transfer amount to the product, and transfer amount as waste are calculated (calculation process 35).

Since the releasing and transferring coefficient is a value indicative of a ratio between a handling amount of the managing substance in the process and releasing and transferring amount of the managing substance in the process, the releasing and transferring amount of the managing substance per releasing and transferring destination can be calculated by multiplying the handling amount of the managing substance by the releasing and transferring coefficient. When the substance is metal salt, pure metal element as released or transferred managing substance is required. In this case, using the physical property data of the managing substance, the mass weight of the pure metal element is derived through conversion. Finally, the evaluation tabulation link information as link information between the releasing and transferring amount record as the result record and the substance handling amount record and the release coefficient record as original records, is stored in the result database 110 (storing process 36).

FIG. 7 is a flowchart showing a total tabulation process for implanting the total tabulation processing portion 109 shown in the embodiment of the present invention shown in FIG. 1.

In the total tabulation processing portion 109, total tabulation process is performed. The total tabulation process includes a process identification process 37, a read out process 342 read out process 39, a tabulation process 40 and a storing process 41.

At first, a process group corresponding to designated tabulation range (for example, workplace, division, section, line, process step, business office, business group, area and so forth), is identified (process identification process 37). Then, the releasing and transferring amount record of the process group in the designated period (e.g. from Apr. 1, 1999 to May 31, 1999) is read out from the result database (read out process 38). Furthermore, only releasing and transferring amount record of the designated managing substance group (for example, designated substances of Environment Agency (Japan)) is taken out (read out process 39). These records are tabulated (tabulation process 40). It should be noted that the designation of the tabulation range, the designation of the period and the designation of the managing substance group are performed by the research processing portion 101. Finally, a total tabulation link information as the link information between the tabulation result record as the result record and the releasing and transferring amount record as original data, is stored in the result database (storing process 41).

Figure 12:
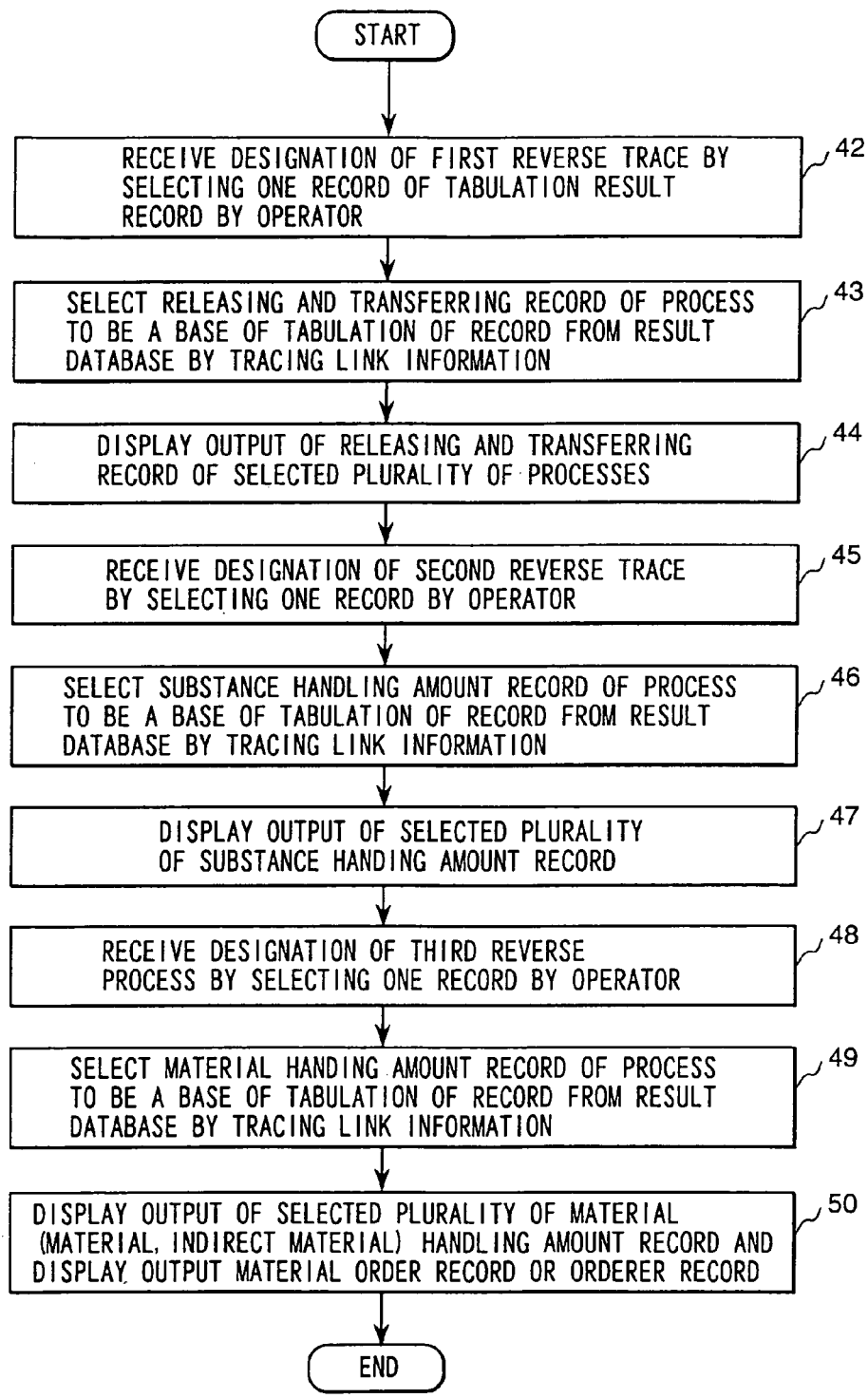
FIG. 12 is a flowchart showing a back tracing process in one embodiment of the chemical substance total management system according to the present invention.

FIG. 12 is a flowchart of a back tracing process for implementing the back tracing portion 112 in the shown embodiment of the present invention shown in FIG. 1.

In the back tracing portion 112, the back tracing process is performed. The back tracing process serves as back tracing function and includes a first reception process 42 performing a first stage retrieval process, a first retrieval or back tracing process 43, a first display process 44, a second reception process 45 performing a second stage retrieval or back tracing process, a second retrieval process 46, a second display process 47, a third input process 48 performing a third stage retrieval process, a third retrieval or back tracing process 49 and a third display process 50. It should be noted that three retrieval processes, i.e. the first stage retrieval process, the second stage retrieval process and the third stage retrieval process are not essential and at least one of the retrieval process will be sufficient. It can be only first stage retrieval process, the second stage retrieval process or the third stage retrieval process. Also, only two retrieval processes would be sufficient. It can be the first and second stage retrieval processes.

At first, selection of the tabulation result record on an output display image by the operator results in reception of designation of the first stage retrieval process (first reception process 42). From the result database 110, the releasing and transferring amount record of the process to be a source of tabulation of the tabulation result record is retrieved by tracing the total tabulation link information (first retrieval process 43). A plurality of retrieved releasing and transferring amount record is output on the display (first display process 44).

Next, selection of one of the records among a plurality of releasing and transferring amount record on the output display image by the operator results in reception of designation of the second stage retrieval process (second reception process 45). Then, the substance handling amount record as a source of generation of the releasing and transferring amount record designated from the result database 110, is retrieved by tracing the evaluation tabulation link information (second retrieval process 46). A plurality of retrieved substance handling amount record is output for displaying (second displaying process 47).

Selection of one of the records among a plurality of substance handling records on the output display image by the operator results in reception of designation of the third stage retrieval process (third input process 48). The material handing amount record as a source of generation of the substance handling amount record designated from the result database 110, by tracing the process tabulation link information (third retrieval process 49). A plurality of selected material handling amount records are output displayed and material order code, orderer code and so forth are also retrieved for outputting on the display (third display process 50). The display process of the supplementary information is preferred in the shown embodiment of the system but can be omitted.

Figure 13:
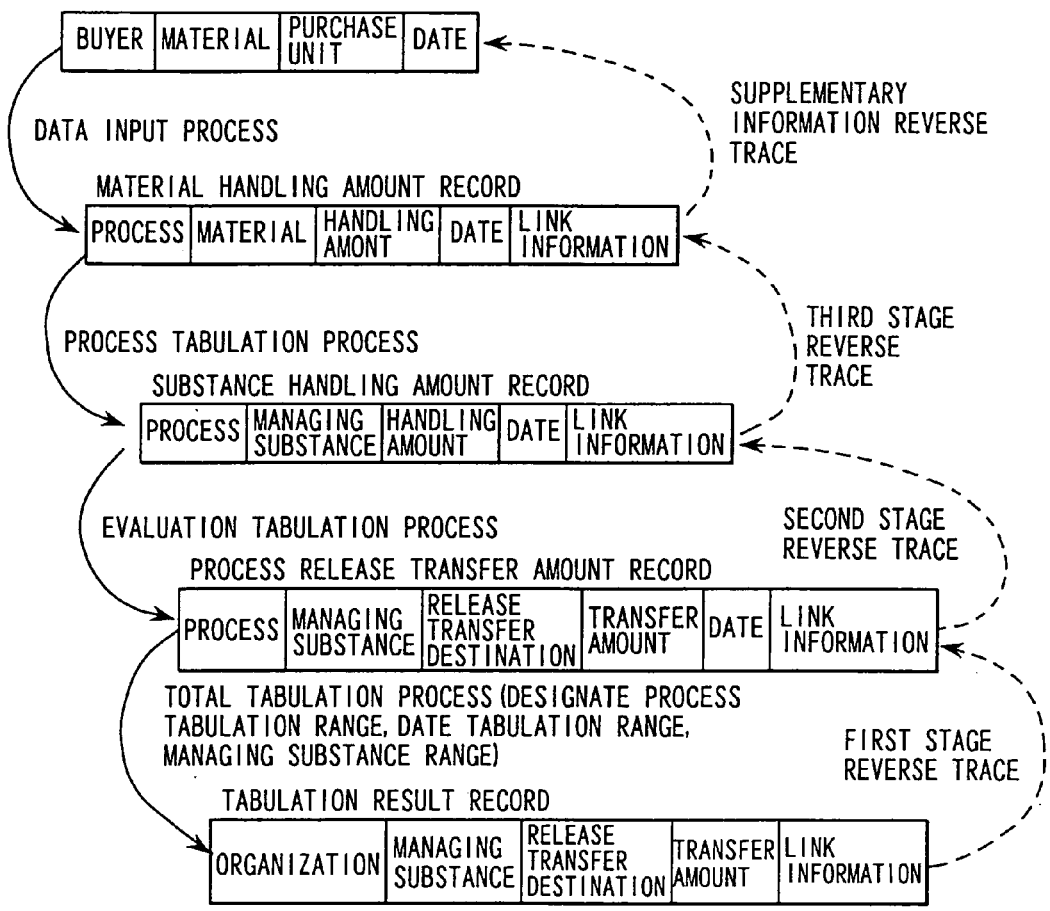
FIG. 13 is a conceptual illustration for supplementary explanation of the tabulation process and retrieval process in one embodiment of the chemical substance total management system according to the present invention.

FIG. 13 is a conceptual illustration for supplementary explanation of the tabulation process and the retrieval process in the shown embodiment of the present invention.

Five kinds of records, i.e. material management record, the material handling amount record, the substance handling amount record, the releasing and transferring amount record and the tabulation result record, are processed or generated in the shown system. The flow shown by the arrow on left side is normal operation process, namely data input process, the process tabulation process, the evaluation tabulation process and total tabulation process. On the other hand, the arrow in wavy line on the right side shows retrieval process using the link information in each record as primary feature of the present invention, i.e. the first retrieval process, the second retrieval process, the third retrieval process and the supplementary information retrieving process.

Figure 14:
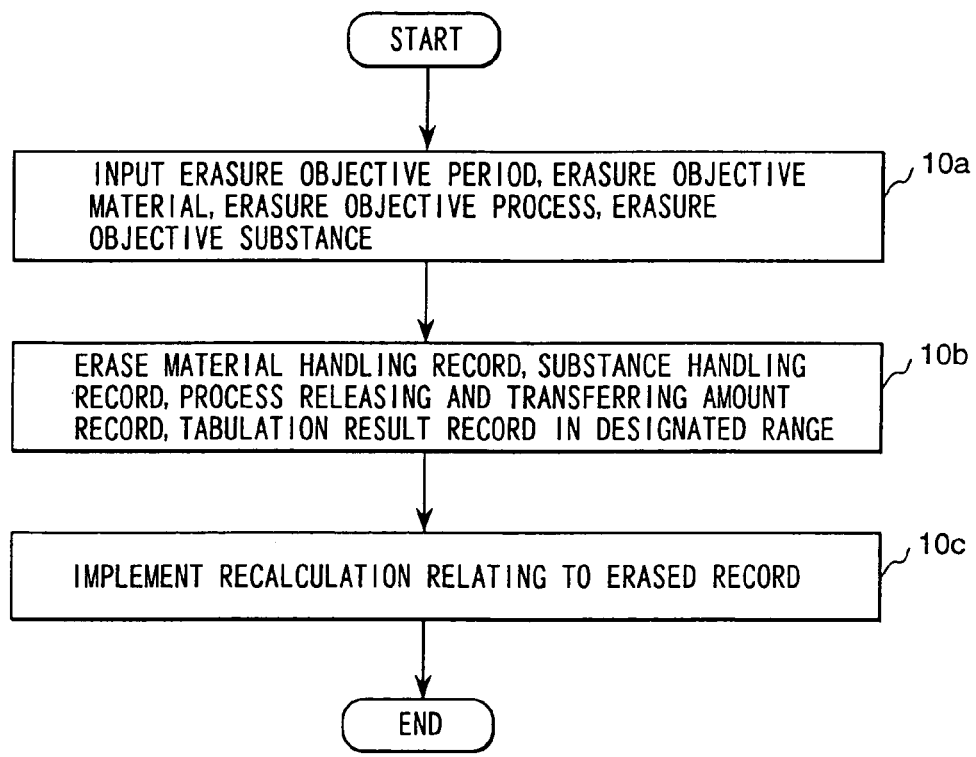
FIG. 14 is a flowchart showing a process of making over records under new condition in one embodiment of the chemical substance total management system according to the present invention.

In FIG. 13, it appears that one record is generated from one record. However, it is possible that a plurality of records are generated from one record, and that one record is generated from a plurality of records. Therefore, the relationship is N-to-N relationship, basically. While it is not required in merely preparing a legal notification document, it is necessary to store a record to be an intermediate course shown in FIG. 13 for implementing the retrieval process. In this case, as new problem, needs to re-generate new records with new condition with erasing existing past record, is caused. For example, in the past, composition information of the material (managing substances contained in the material and contents of the managing substances) are indefinite, definite composition information is obtained recently. At this time, updating process to erase all of corresponding records by designating a range, such as particular period or particular material and to perform re-calculation in new condition. Implementing method this means will be discussed with reference to FIG. 14.

A risk communication aiding means 113 is means for providing functions for tracing not only correlation on computation but also link in the meaning for respective fields in connection with record of each process shown in FIG. 10. Namely, concerning the material, composition information of the material is retrieved from the material composition database 104 for outputting to display. In the alternative, MSDS information is retrieved from the MSDS database 102 for outputting to display. On the other hand, concerning the managing substance, information of the substance is retrieved from the managing substance database 105 for outputting to display. Furthermore, the release and transfer coefficient in connection with the relevant process of the relevant substance is retrieved from the release coefficient database for outputting to display. By these functions, for inquire relating to the release and transfer data from neighboring residents or interested parties, communication can be performed with confidence based on the based data.

Figure 15:
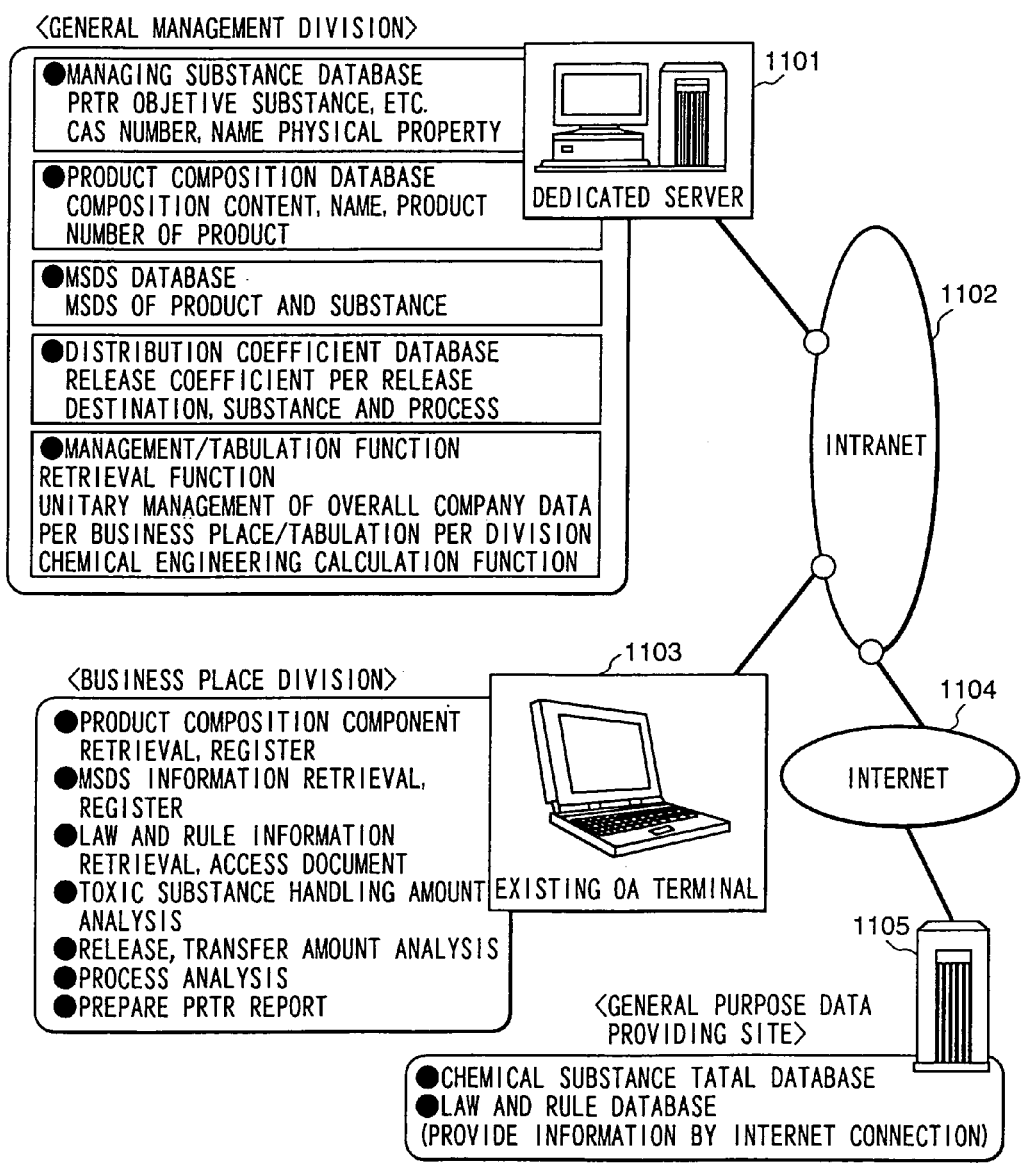
FIG. 15 is a diagrammatic illustration showing a system construction of one embodiment of the chemical substance total management system according to the present invention.

FIG. 15 shows an example of a system construction of a computer system forming the shown embodiment of the chemical substance total management system according to the present invention.

A dedicated server computer 1101 is installed in a general managing division to include all database and processing portions shown in FIG. 1. By connecting the dedicated server computer 1101 to a corporate network or intranet 1102, terminal computers 1103 at various factories, business offices and so forth in the corporation are enabled to use all functions. On the other hand, by placing the database shown in FIG. 1 in a general purpose data providing site 1105 outside of the corporation and connecting to the site 1105 through an internet 1104, it becomes possible to effectively use wide range data which cannot be stored in the dedicated server computer, or frequently updated data. It is preferred to distribute the MSDS data, the material composition data, the managing substance data and the releasing coefficient data to the dedicated server computer 1101 via the internet 1104 and the corporate network or the intranet 1102 for updating.

Figure 16:
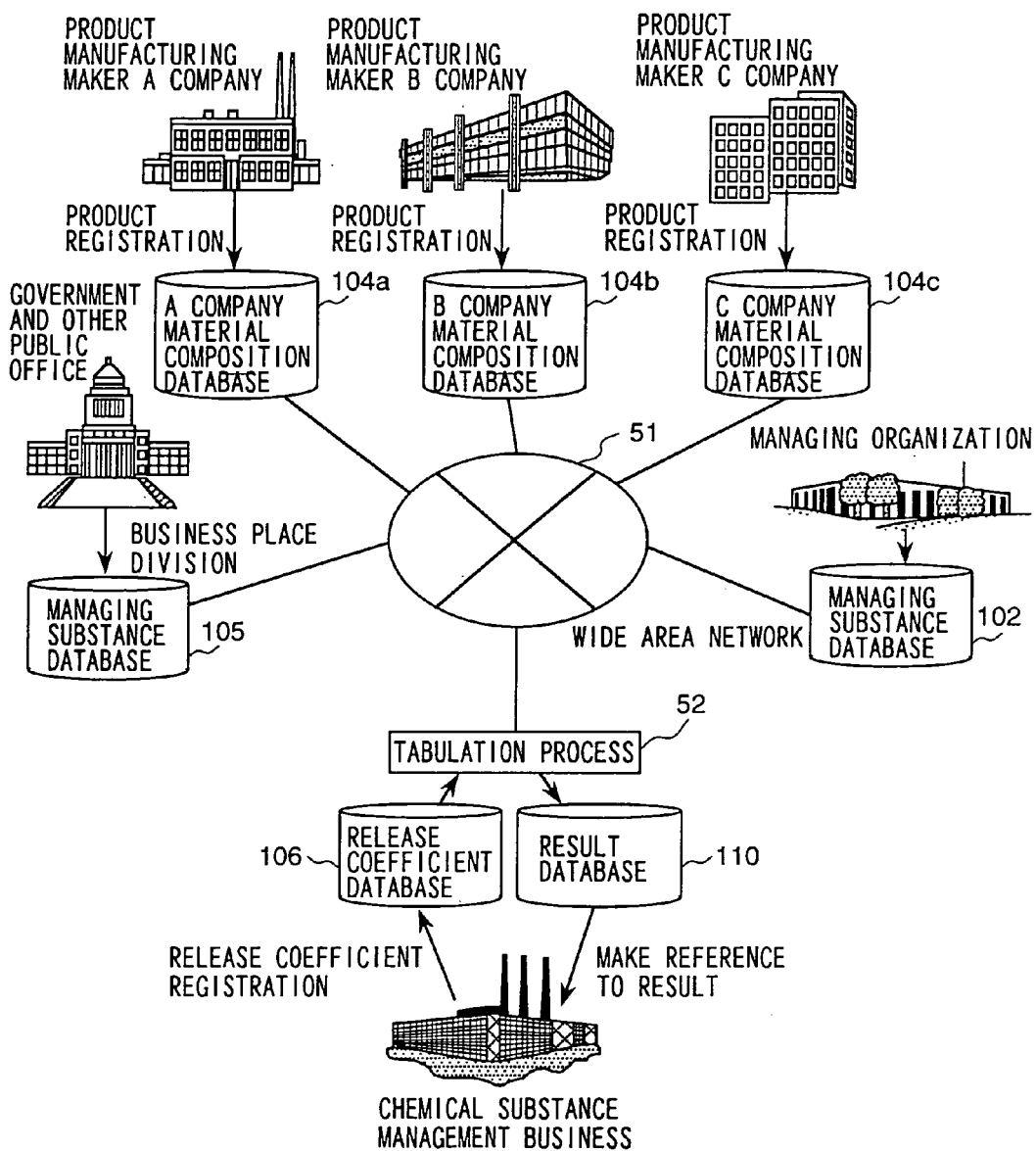
FIG. 16 is an illustration showing one embodiment of the chemical substance total management system according to the present invention.

FIG. 16 shows the chemical substance total management system, in which material composition database, the managing substance database and the MSDS database are distributed, as one embodiment of the present invention.

Product manufacturing makers A company, B company and C company respectively hold material composition databases (104a, 104b, 104c). Government and public offices establish data of substances demanding management and thus hold managing substance database 105. Managing corporate bodies establish data of substances necessary to be managed and thus hold MSDS databases 102. These databases are connected by a wide area network 51. Company implementing management of chemical substances (chemical substance managing company) may access information necessary for management of the substance through the wide area 51 and thus may obtain necessary information. On the basis of the information and release coefficient database 106, the chemical substance managing company performs tabulation process 52 of transfer amount to release and transfer destination of chemical substances contained in the material to be handled or in the product to store the result of tabulation in the result database 110.

Figure 17:
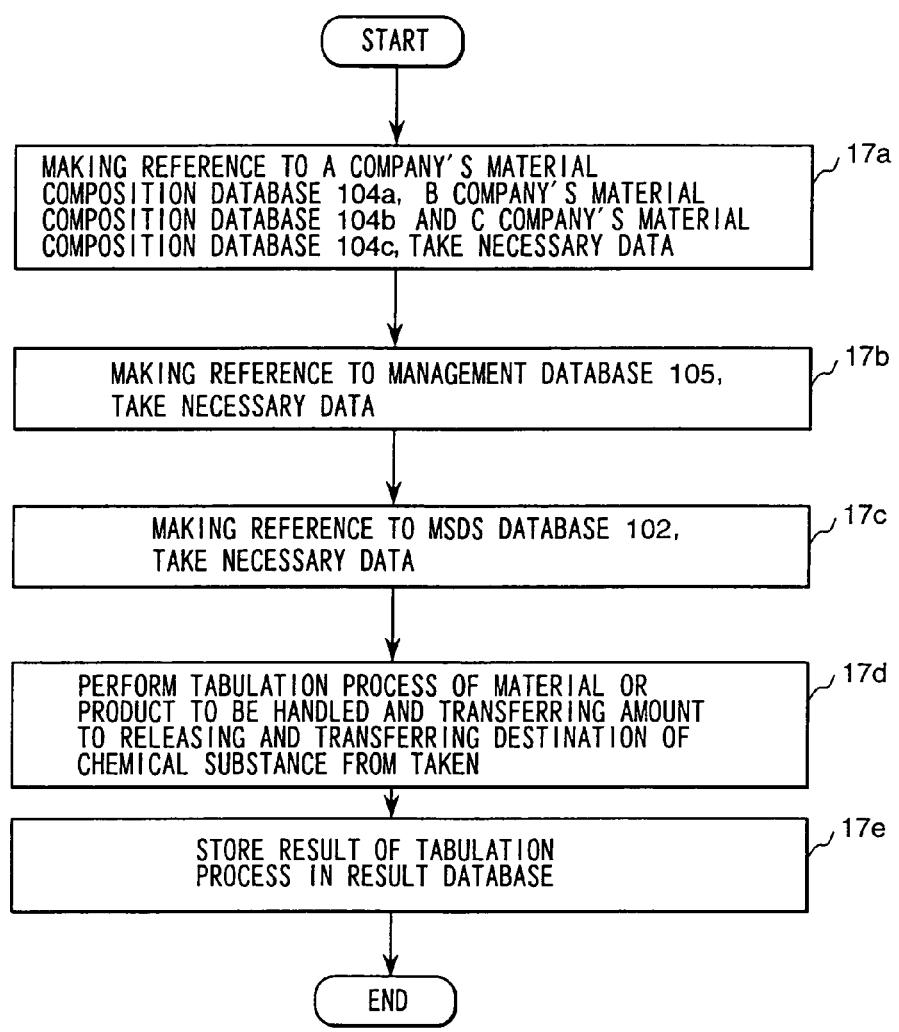
FIG. 17 is a flowchart shoring tabulation process of transfer amount to releasing destination of the chemical substance.

FIG. 17 is a flowchart showing tabulation process of the transfer amount to the release and transfer destination of the chemical substance contained in the material to be handled by the chemical substance managing company or the product.

The chemical substance managing company takes out the material composition data relating to chemical substance contained in the material to be handled by the chemical substance managing company or the product with reference to the material composition database 104a of A company, the material, the material composition database 104b of B company and the material composition database 104c of C company (17a).

Next, managing substance data relating to the chemical substance contained in the material to be handled by the chemical substance managing company or the product thereof with reference to the managing substance databases of the government and public offices (17b).

Then, MSDS data relating to the chemical substance contained in the material to be handled by the chemical substance managing company or the product thereof with reference to the MSDS databases 102 of the managing corporate bodies (17c).

Taking of the necessary data at steps 17a to 17c may be performed arbitrarily. Order to acquire the data is not specified but can be random.

Then, the chemical substance management company performs tabulation process of transfer amount to the release and transfer destination of the chemical substance contained in the material to be handled or in the product thereof on the basis of respective acquired data and release coefficient data of own release coefficient data 106 (17d).

Finally, the result of tabulation process is stored in the own result database 110 (17e).

Hereinafter discussion will be given for business models utilizing the shown embodiment of the chemical substance total management system according to the present invention.

Figure 18:
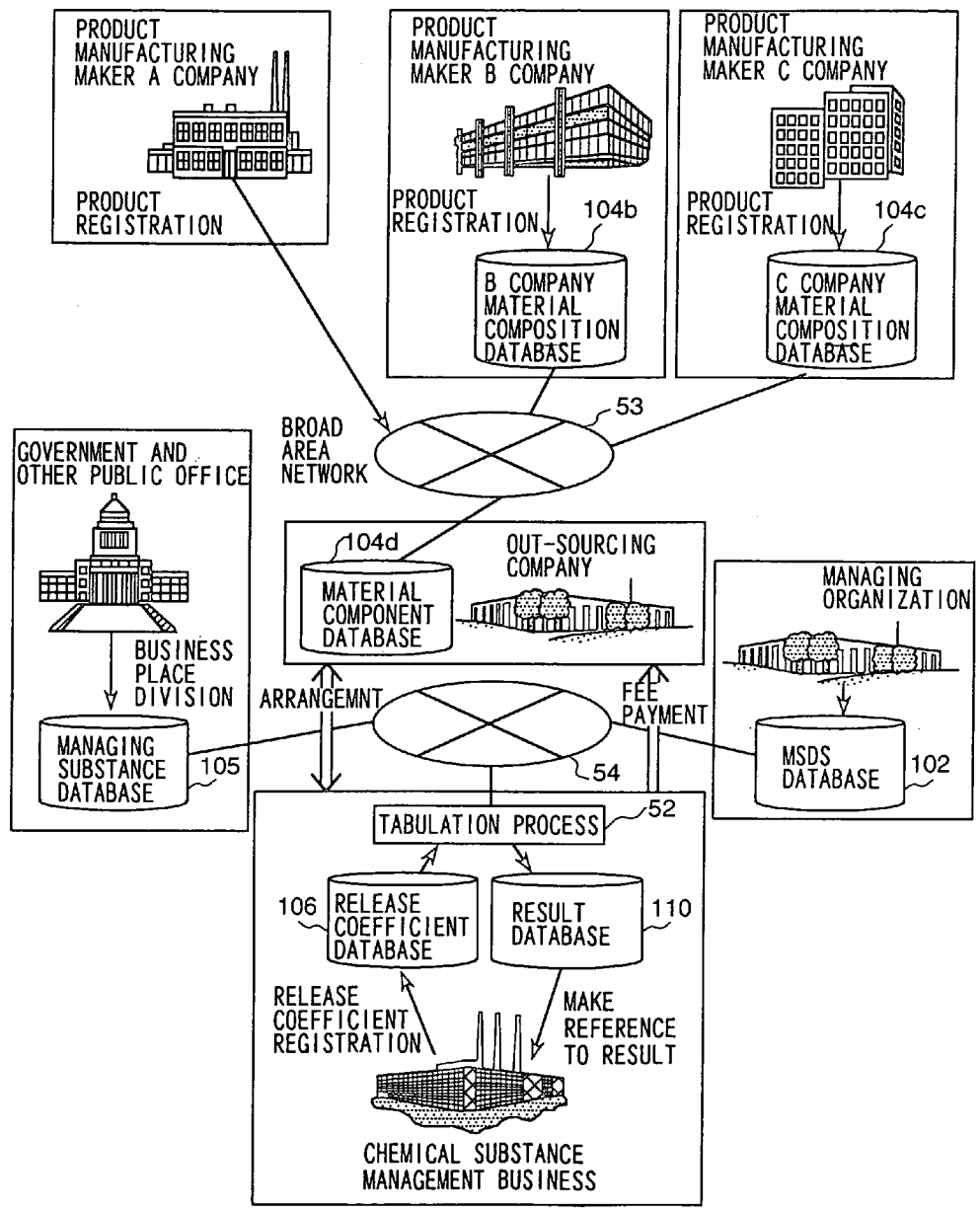
FIG. 18 is a conceptual illustration for performing chemical substance total management via an out-sourcing company in one embodiment of the chemical substance total management system according to the present invention.

FIG. 18 shows an embodiment, in which an out-sourcing company intervenes between the product manufacturing maker and the chemical substance managing company, for concentrating the material composition data. As database to be held by the out-sourcing company, the material composition data provided from the product manufacturing maker is stored.

Here, the product information of A company is registered in the material composition database 10d of the out-sourcing company via the wide area network. Also, the product information of B company and C company as the product manufacturing makers, registered in the material composition database 104b of B company and the material composition database 104c of C company, are registered in the material composition database 104d of the out-sourcing company via the wide area network. By this, the material composition information of the products of respective of A, B and C companies are centralized in management by the out-sourcing company to provide information in the material composition database 104 held by the out-sourcing company upon demand of the chemical substance managing company.

It should be noted that a fee arrangement for service to be provided may be established between the out-sourcing company and the chemical substance managing company. As the arrangement, a membership system, usage sensitive rate system for determining the fee depending upon amount of information provided may be considered.

Payment of the fee for the service provided by the out-sourcing company may be done by automatic debit transfer from a credit card account. In such case, upon application for service of the out-sourcing company, the credit card account is registered. Annular charge may be automatically transferred from the credit account at a predetermined timing. On the other hand, fee depending upon the amount of information provided upon services, the fee may be automatically transferred.

On the other hand, the managing substance database 105, in which the management objective substances are registered by the government and public offices and the MSDS database 102, in which the management objective substance registered by the management corporate body are non-profit public database, the chemical substance managing company may be accessible of such database through other wide area network.

The chemical substance managing company accesses the material composition database 104*d* owned by the out-sourcing company and the managing substance 104 listing substances necessary to be managed via the wide area network to obtain necessary information to identify materials to be charged in the manufacturing process or substance constituting the product. Then, tabulation process of transfer amount of the substance in releasing and transferring destination is performed on the basis of the release coefficient database 106 owned in respective companies per identified substance, and the result of tabulation is registered in the result database 110.

Figure 19:
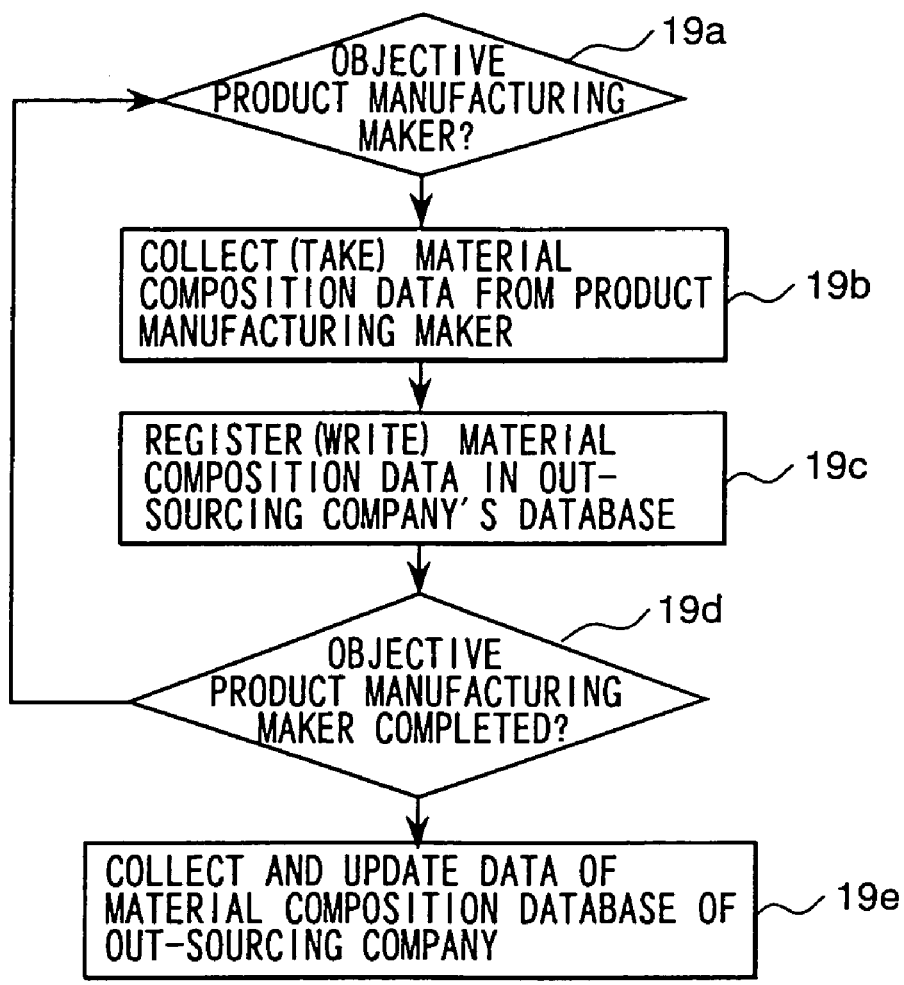
FIG. 19 is a flowchart of process of collecting and updating data stored in material composition database held by the out-sourcing company.

FIG. 19 is a flowchart showing a process of collecting and updating data stored in the material composition database owned by the out-sourcing company.

At first, a check is performed whether the product manufacturing maker is the objective product manufacturing maker or not (19*a*).

Next, if the product manufacturing maker is the objective product manufacturing maker, the material composition data is collected from the product manufacturing maker (19*b*).

Then, the collected material composition data is registered in the material composition database 104*d* of the out-sourcing company (19*c*)

Thereafter, a check is performed whether data collection from the objective product manufacturing maker is completed or not (19*d*).

By performing this process for other objective product manufacturing makers, collection and updating of data stored in the material composition database 104*d* owned by the out-sourcing company is performed.

By this, the material composition information of the products in respective companies is concentrically managed by the out-sourcing company. Upon demand of the chemical substance management company, information of the material composition database 104*d* owned by the out-sourcing company can be provided.

Figure 20:
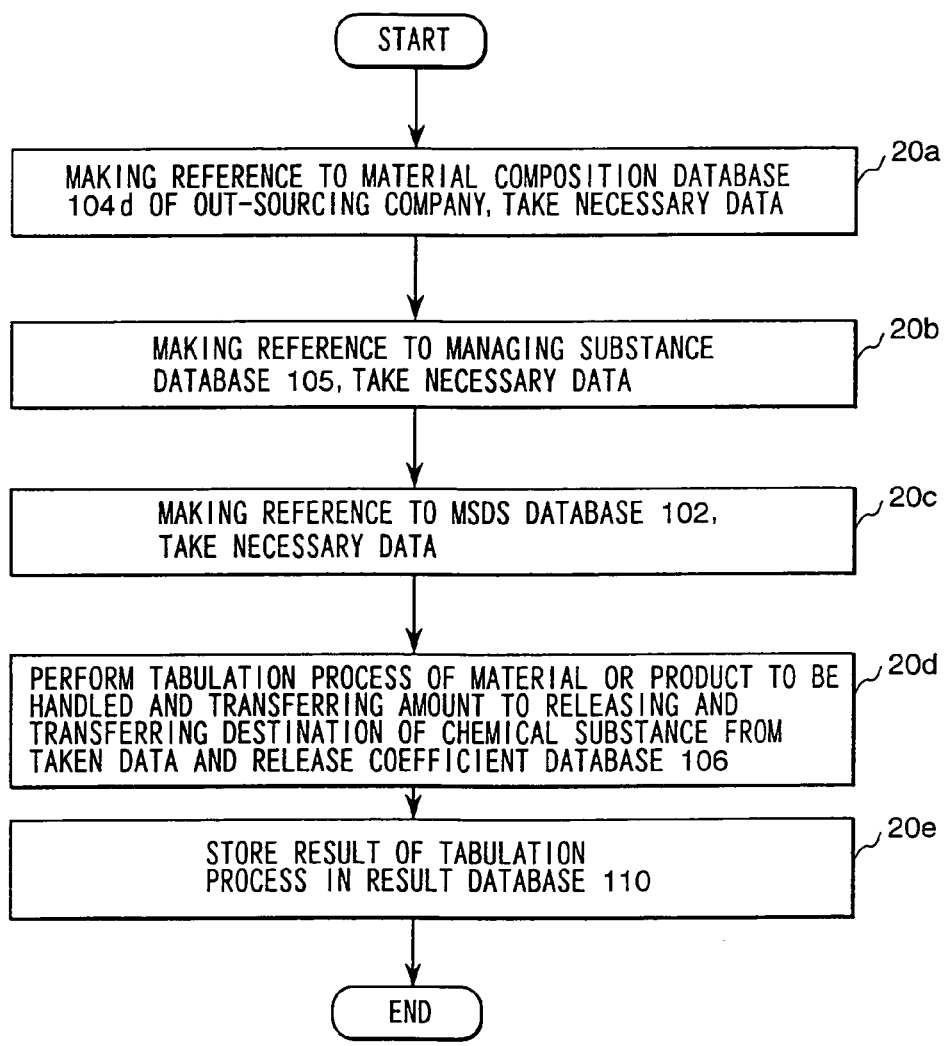
FIG. 20 is a flowchart of tabulation process of transfer amount to the releasing destination of the chemical substance contained in the material to be handled or the product of the chemical substance management company.

FIG. 20 is a flowchart for tabulation process of transfer amount to release and transfer destination of the chemical substance contained in the material handled by the chemical substance management company or the product thereof.

The chemical substance management company takes the material composition data relating to the chemical substance contained in the material handled by the chemical substance management company or the product thereof with reference to the material composition database 104*d* owned by the out-sourcing company (20*a*).

Next, the chemical substance management company takes the managing substance data relating to the chemical substance the material handled by the chemical substance management company or the product thereof with reference to the management substance database 105 or the like of the government and public office (20*b*).

Then, the chemical substance managing company takes the MSDS data relating to the chemical substance contained in the material handled by the chemical substance management company or the product thereof with reference to the MSDS database 102 of the managing corporate body (20*c*).

It should be noted that taking of necessary data at steps 20*a* to 20*c* may be performed arbitrarily and the order of taking necessary data can be random.

Then, the chemical substance managing company performs tabulation process of the transfer amount to release and transfer destination of the chemical substance contained in the material handled by the chemical substance management company or the product from the release coefficient data of own release coefficient database 106 of their own (20*d*).

Finally, the result of tabulation process is stored in own result database 110 (20*e*).

Figure 21:
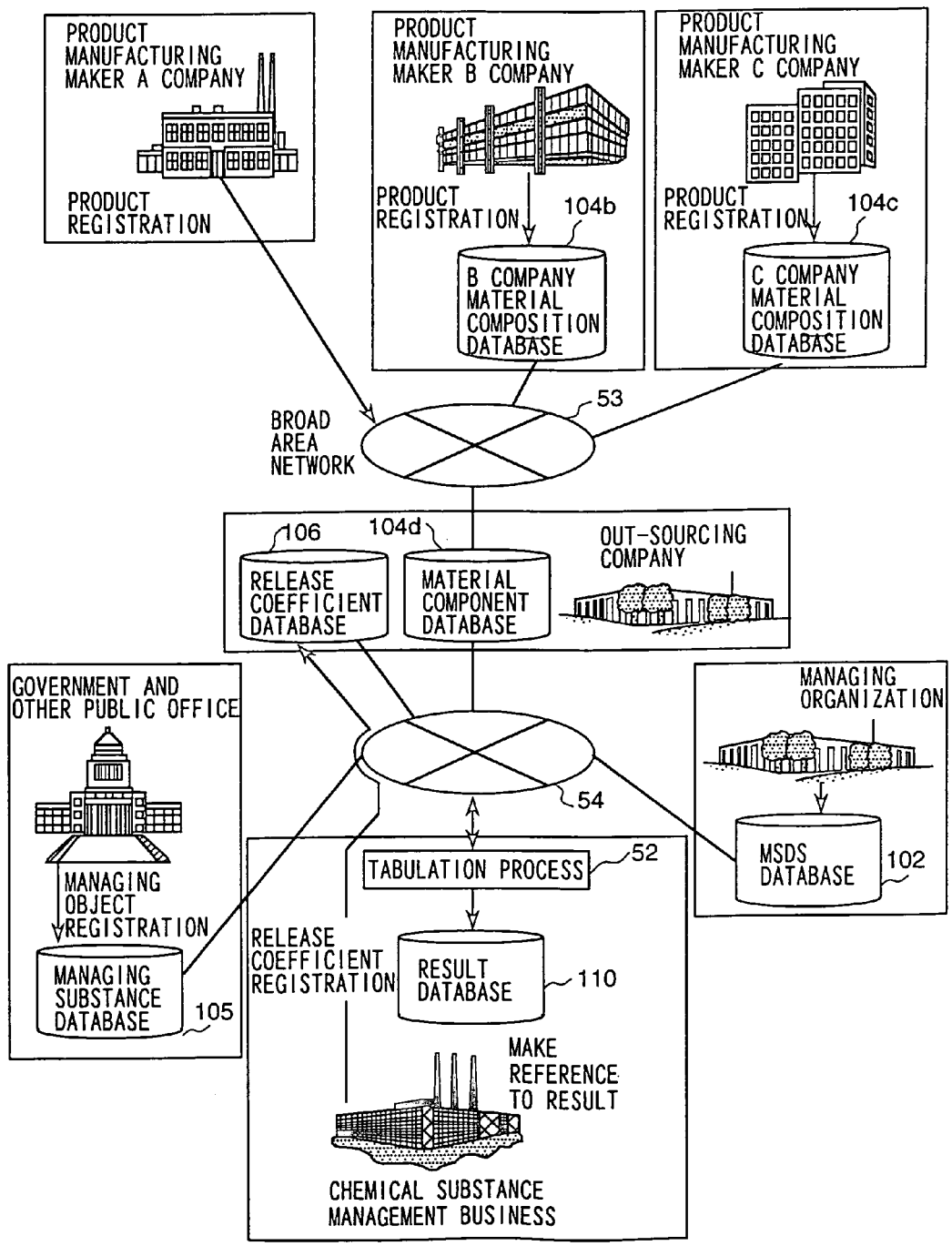
FIG. 21 is a conceptual illustration for performing chemical substance total management via the out-sourcing company in the one embodiment of the chemical substance total management system according to the present invention.

FIG. 21 shows the chemical substance total management system, in which the chemical substance total management system shown in FIG. 18 is modified by providing the release coefficient database in the out-sourcing company. Information of the release coefficient database 106 is information registered in the release coefficient database by preparing the release coefficient data through analysis of manufacturing step and manufacturing process in the company made by the chemical substance managing company. Then, the chemical substance managing company is required to transfer material stocking information, stocked material use condition information to the out-sourcing company. Them tabulating operation and report preparation for chemical substance management is performed by the out-sourcing company.

Figure 22:
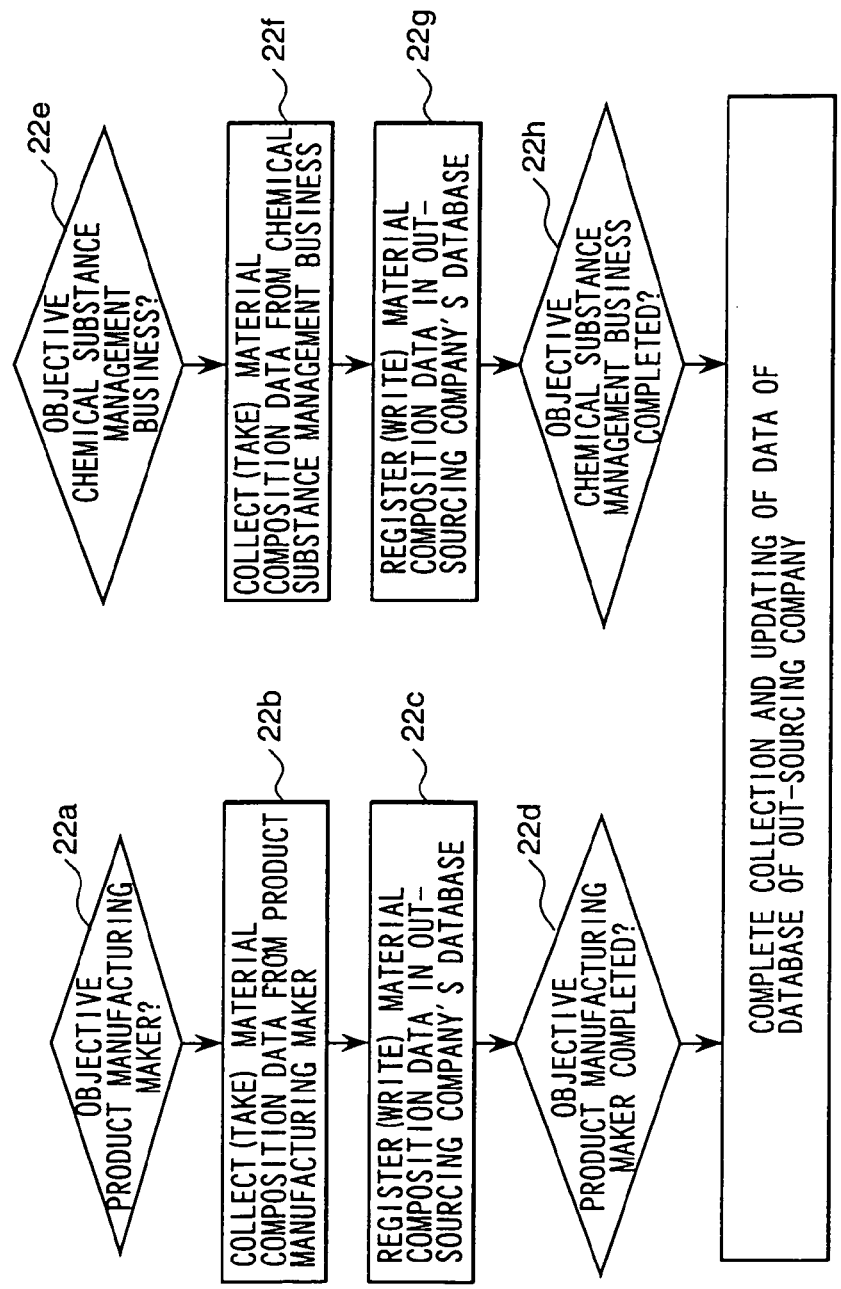
FIG. 22 is a flowchart of a process for collecting and updating data stored in a material composition database 104d and a transfer coefficient database 106 maintained by the out-sourcing company.

FIG. 22 is a flowchart of the process for collecting and updating data stored in the material composition database 104*d* and release coefficient database 106 owned by the out-sourcing company.

The process of collecting and updating data stored in the material composition database 104*d* is similar to FIG. 20 (22*a* to 22*d*).

The process of collecting and updating data stored in the release coefficient database 106, at first, performs judgment whether the chemical substance managing company is the objective chemical substance managing company (22*e*). For example, verification is made whether the chemical substance management company has a service contract with the out-sourcing company.

Next, if the chemical substance managing company is the objective chemical substance managing company, the release coefficient data is collected from the chemical substance managing company (22*f*).

Then, registration of the collected release coefficient data to the release coefficient database 106 owned by the out-sourcing company (22*g*).

Then, judgment is performed whether data collection from the objective chemical substance managing company is performed (22*h*).

The out-sourcing company performs similar process for the chemical substance managing companies holding service contracts. By this process, data stored in the release coefficient database 106 held by the out-sourcing company can be collected and updated.

As set forth above, the material composition information of the products of respective companies can be concentrically managed by the out-sourcing company. On the other hand, the release coefficient database of the chemical substance managing company is also concentrically managed by the out-sourcing company. In response to the demand of the chemical substance managing company, information of the material composition database 104*d* and the release coefficient database 106 owned by the out-sourcing company can be provided.

Figure 23:
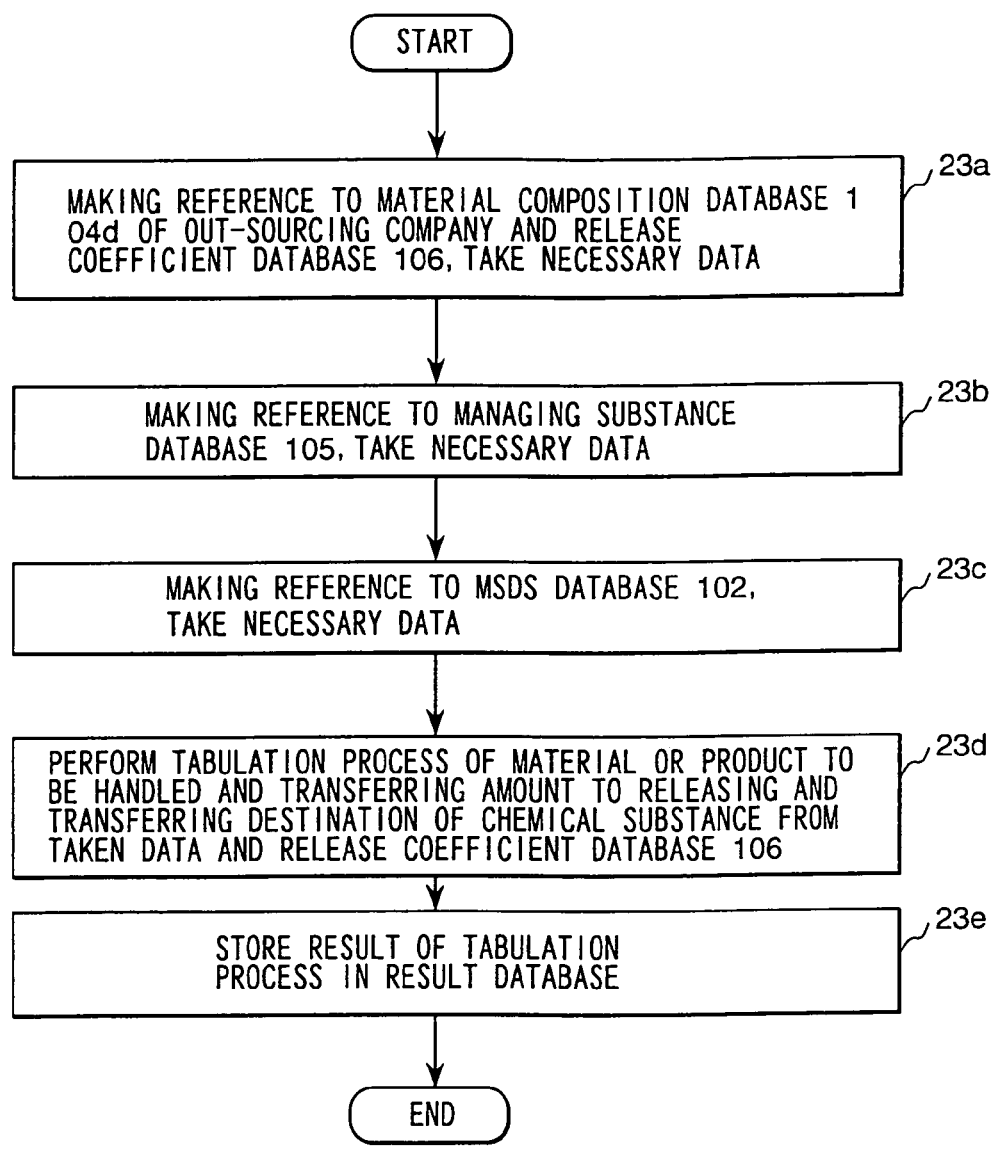
FIG. 23 is a flowchart of tabulation process of transfer amount to the releasing destination of the chemical substance contained in the material to be handled or the product of the chemical substance management company.

FIG. 23 is a flowchart showing tabulation process of the transfer amount to the material handled by the chemical substance management company or the product thereof.

The chemical substance managing company takes the material composition data and the release coefficient data relating the chemical substance contained in the material handled by the chemical substance management company or the product thereof with reference to the material composition database 104*d*, the release coefficient database 106 or the like of the out-sourcing company (23*a*).

Next, the chemical substance managing company takes the managing substance data relating to the chemical substance contained in the material handled by the chemical substance management company or the product thereof with reference to the managing substance database 105 or the like of the government and public offices (23*b*).

Then, the chemical substance managing company takes MSDS data relating to the chemical substance contained in the material handled by the chemical substance management company or the product thereof with reference to MSDS database 106 of the managing corporate bodies (23*c*).

Taking of the necessary data at steps 23*a* to 23*c* may be performed arbitrarily. Order to acquire the data is not specified but can be random.

Then, the chemical substance managing company performs tabulation process of the transfer amount to the release and transfer destination of the chemical substance contained in the material handled by the chemical substance management company or the product thereof from respective of the taken data (23*d*).

Finally, the result of the tabulation process is stored in the own result database (23*e*).

Figure 24:
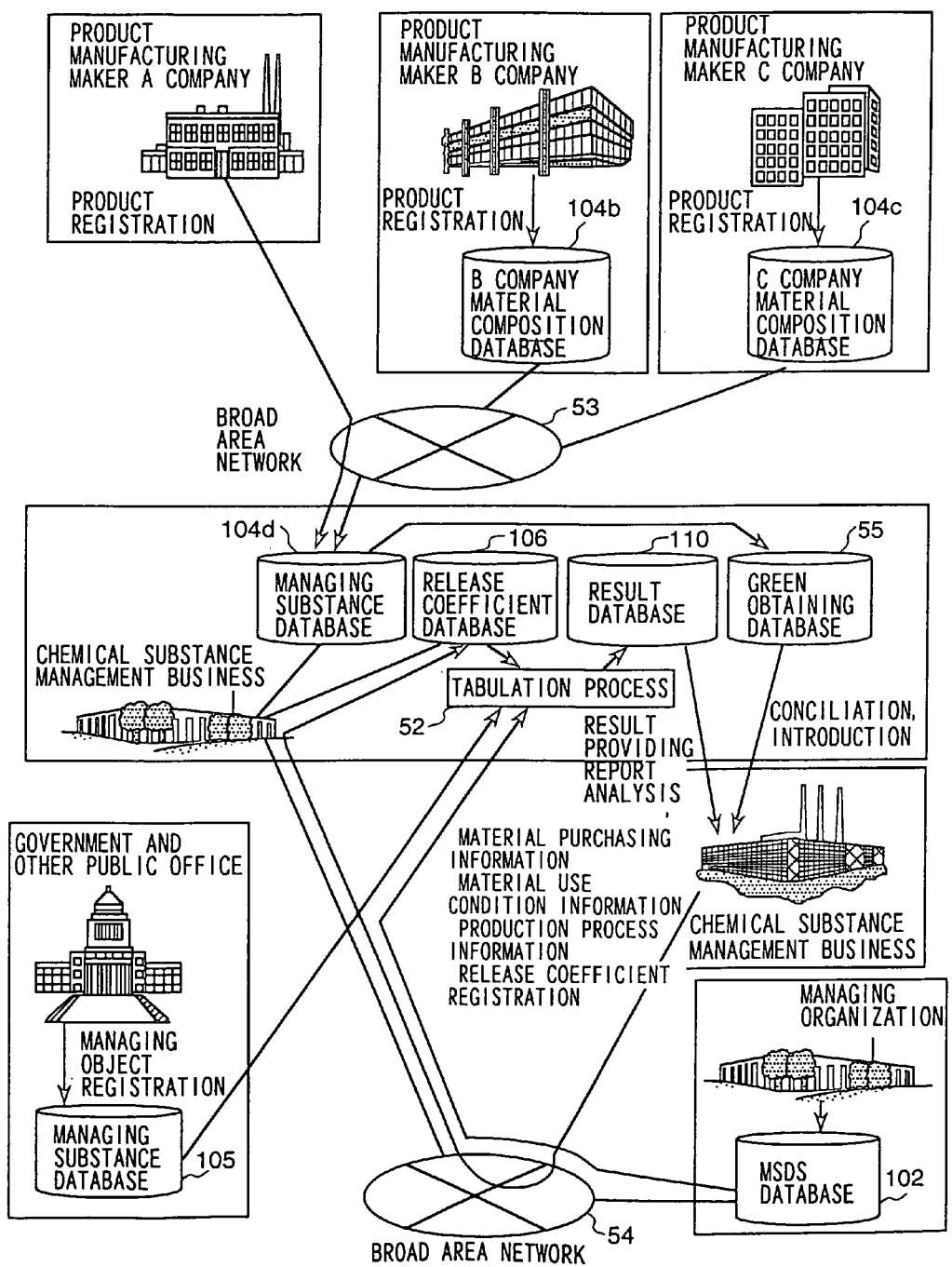
FIG. 24 is a conceptual illustration for performing chemical substance total management via the out-sourcing company in the one embodiment of the chemical substance total management system according to the present invention.

FIG. 24 is the chemical substance total management system which is established by modifying the chemical substance total management system shown in FIG. 18 by providing the releasing coefficient database 106 and the result database 110 in addition to the material composition database 104*d* in the out-sourcing company to permit the out-sourcing company to perform chemical substance management operation managing the chemical substance managing company. The chemical substance managing company performs analysis of the manufacturing step and manufacturing process in the company, prepares the release coefficient data and registers in the out-sourcing company. Then, when the chemical substance managing company transfers the material stocking information, stocked material use condition information to the out-sourcing company, tabulating operation and preparation of report for chemical substance management can be done by the out-sourcing company.

On the other hand, in the out-sourcing company, using information of the material composition database 104*d*, a green procurement database 55 may be prepared for providing green procurement information to be indicia of material stocking to the chemical substance management company. Then, upon considering material stocking in the chemical substance managing company, the material which does not affect for environment can be easily find out to permit reduction of the chemical substance and procurement of replacing stocking material.

It is possible that fee arrangement is established concerning management operation, such as tabulating operation for management of chemical substance, preparation of report and so forth between the out-sourcing company and the chemical substance managing company. As the arrangement, a membership system, usage sensitive rate system for determining the fee depending upon amount of information provided may be considered.

Processes for collecting and updating data stored in the material composition database 104*d* and the release coefficient database 106 owned by the out-sourcing company are the same as those shown in FIG. 22.

Figure 25:
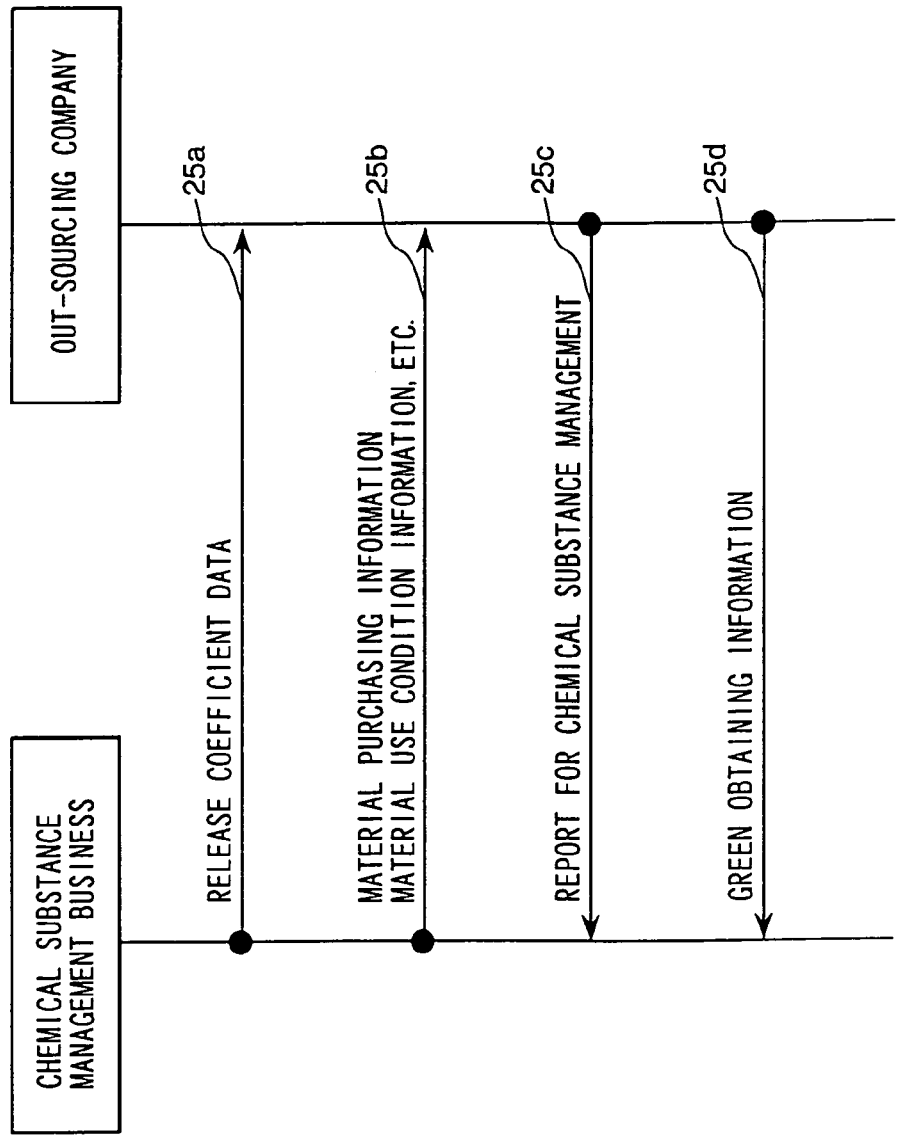
FIG. 25 is an illustration showing exchange of information between the chemical substance management company and the out-sourcing company.

Here, exchange of information between the chemical substance managing company and the out-sourcing company is shown in FIG. 25.

At first, the chemical substance managing company makes analysis of the manufacturing step and the manufacturing process in the company, prepares the release coefficient data, and registers the release coefficient database of the out-sourcing company (25*a*).

Then, the chemical substance managing company announces material stocking information, stocked material use condition information and so forth (25*b*).

The out-sourcing company receiving this information performs tabulation operation and preparation of report and feeds the information to the chemical substance managing company (25*c*).

On the other hand, in the out-sourcing company, the green procurement is prepared in the out-sourcing company using information of the material composition database 104*d* and provides green procurement information to be indicia of material stocking to the chemical substance managing company (25*d*).

Figure 26:
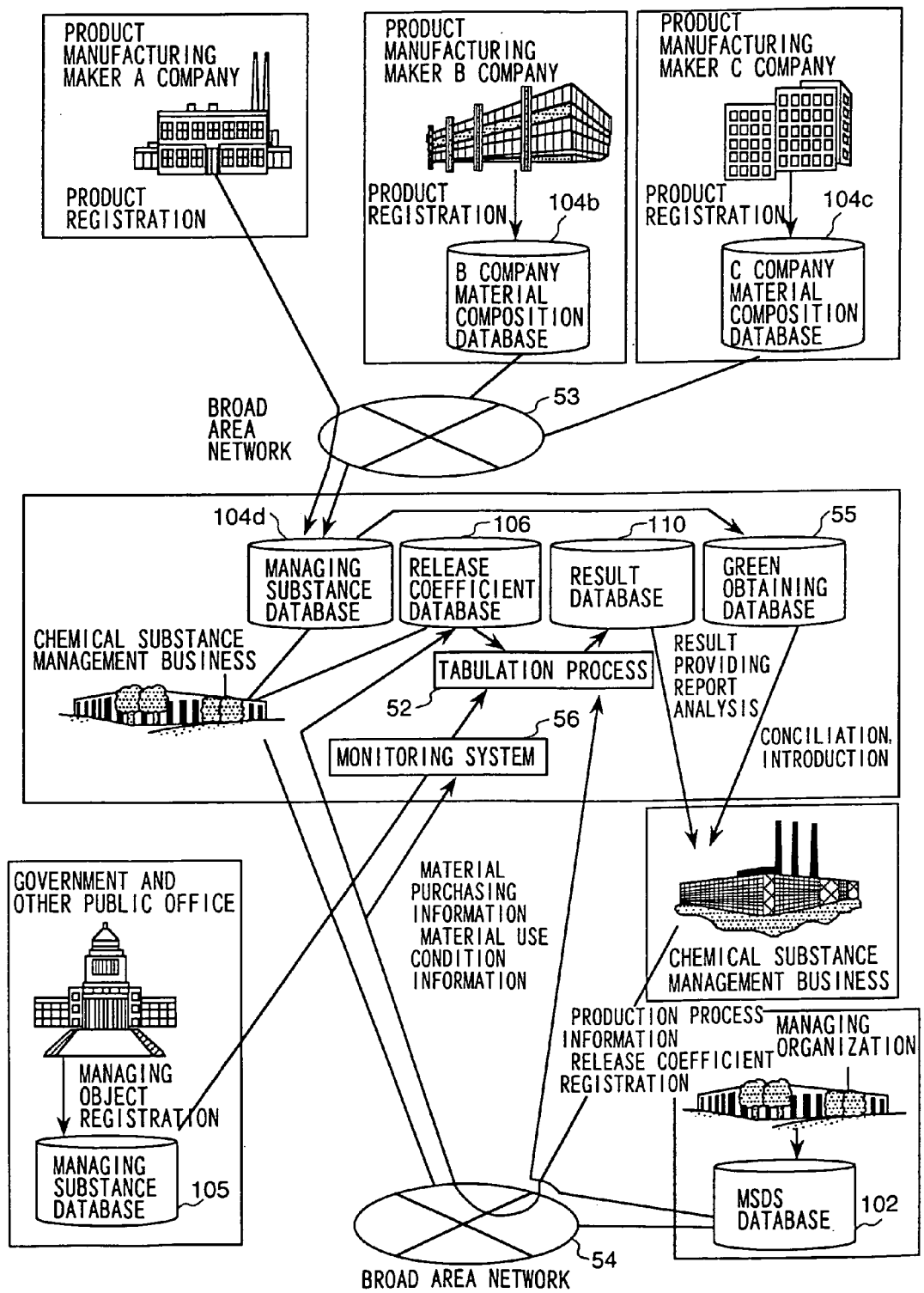
FIG. 26 is a conceptual illustration for performing chemical substance total management via the out-sourcing company in the one embodiment of the chemical substance total management system according to the present invention.

FIG. 26 shows the chemical substance total managing system constructed by modifying the chemical substance total managing system of FIG. 24 by providing a monitoring system in the out-sourcing company for automatically collecting the material stocking information, stocked material use condition information, manufacturing process information, waste information and so forth of the chemical substance managing company. The out-sourcing company can obtain basic information for chemical substance management, and the chemical substance managing company becomes free from information correcting operation, mainly.

It should be noted that obtaining of information, such as material stocking information, stocked material use condition information, manufacturing process information, waste information and so forth is as follows, for example.

The material stocking information to be obtained includes material maker name, material tradename, purchasing amount, due in date, and information registered in material stocking ordering system of the chemical substance managing company can be a basic information. Here, the material stocking ordering system is the system to perform ordering arrangement of material stocking and purchased product reception management. Then, material stocking information may be regularly exchanged for example upon material stocking or once a month or so forth. As a method for obtaining information, exchange of information is performed using dedicated line, public line, network and so forth.

The stocked material use condition information is information representative of how much of the stocked material is consumed, in the material stocking information. For example, inventory clearance information of the stock implemented regularly (e.g. once/month, once/week), level of storage tank or integrated value of flow rate flowing in a piping from the tank in case of liquid, weight of the storage tank or integrated value of flow rate flowing in a piping from the tank in case of gas may be the information. Data of plant and facility is frequently managed by manufacturing management system. Therefore, exchange of information is performed by the manufacturing management system through the dedicated line, the public line, the network and so forth.

The manufacturing process information is information for comprehending the material use fee in the divided range since it is information per step further breaking down the factory or plant, and is information for comprehending stocked material use amount in the broken down range.

The waste information is information of the waste flowing in the drain processing facility in the chemical substance managing company or the waste to be disposed by leaving to the waste disposing business entity.

It should be noted that a sampling period of respective information has to be adapted to the period of the chemical substance management. However, when chemical substance management is to be performed strictly, the sampling period of respective information has to be made shorter.

Processes for collecting and updating data stored in the material composition database 104d and the release coefficient database 106 owned by the out-sourcing company are the same as those shown in FIG. 22.

Here, exchange of information between the chemical substance managing company and the out-sourcing company is shown in FIG. 27.

At first, the chemical substance managing company makes analysis of the manufacturing step and the manufacturing process in the company, prepares the release coefficient data, and registers the release coefficient database of the out-sourcing company (27a).

Then, the chemical substance managing company announces material stocking information, stocked material use condition information and so forth (27b).

The out-sourcing company receiving this information performs tabulation operation and preparation of report and feeds the information to the chemical substance managing company (27c).

On the other hand, in the out-sourcing company, the green procurement is prepared in the out-sourcing company using information of the material composition database 104d and provides green procurement information to be indicia of material stocking to the chemical substance managing company (27d).

Furthermore, the out-sourcing company performs monitoring by automatically collecting material stocking information, stocked material use condition information, manufacturing process information, waste information and so forth of the chemical substance managing company (27e).

Then, the chemical substance managing company is provided monitoring information from the out-sourcing information (27f).

It should be noted that the services provided by the business model utilizing the chemical substance total management system set forth above may be varied significantly depending upon kind of businesses, number of employee, annual handling amount of reported objective chemical substance, number of stocked material handled.

Also, provided services may be (1) reference of the material composition database, (2) in addition to (1), tabulation process of management data and preparation of report for submitting to government or public office, (3) reference and introduction of green procurement database in addition to (2), (4) automatic monitoring in addition to (3), and (5) preparation of report for autonomous management and evidence for proving that kind of business which does not require management.

As set forth above, the first invention may provide the chemical substance total management system and chemical substance total management method for easily managing the managing substance as to where and how much amount of managing substance is released.

The second invention may provide the chemical substance total management system and chemical substance total management method, in which the chemical substance management information can be made common.

The third invention may provide may provide the chemical substance total management method to provide managing business for the business entity which is required management of chemical substance.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A chemical material integrated management system, configured so that a server managed by an out-sourcing company is connected through a wide area network to a plurality of servers managed individually by a plurality of product manufacturing makers, a server managed by a government or public office and a server managed by a chemical substance managing company, wherein said server managed by an out-sourcing company has a judging means for judging whether said product manufacturing maker is an objective product manufacturing maker or not;

a collecting means for collecting material composition data of material or product by accessing through said wide area network to said server managed by said product manufacturing maker in case that said judging means concludes that said product manufacturing maker is the objective product manufacturing maker; and a material composition database for storing material composition data collected by said collecting means, said server managed by a government or public office has a managing substance database for storing a list of substances required to be managed, and said server managed by a chemical substance managing company has a release coefficient database for storing a process to which material or product including a chemical substance and a release rate at said process for an individual release and transfer destination of said chemical substance in a relational manner;

a collecting means for collecting material composition data and managing substance data related to a chemical substance contained in material or product handled by said chemical substance managing company by accessing to said material composition database and said managing substance database through said wide area network;

a process tabulation processing means for calculating a handling amount of a chemical substance at said process on the basis of a record of a handling amount of material or product charged to said process, and said material component data and said managing substance data collected by said collection means; and an evaluation tabulation processing means for calculating a releasing and transferring amount for an individual release and transfer destination of said chemical substance at said process on the basis of a handling amount of said chemical substance and said release coefficient database.

2. A chemical material integrated management system, configured so that a server managed by an out-sourcing company is connected through a wide area network to a plurality of servers managed individually by a plurality of product manufacturing makers, a server managed by a government or public office and a server managed by a chemical substance managing company, wherein said server managed by a government or public office has a managing substance database for storing a list of substances required to be managed, and said server managed by an out-sourcing company has a judging means for judging whether said chemical substance managing company is an objective chemical substance managing company or not;

a collecting means for collecting release coefficient data indicative of relating a process to which material or product including a chemical substance and a release rate at said process for an individual release and transfer destination of said chemical substance by accessing through said wide area network to said server managed by said chemical substance managing company in case that said judging means concludes that said chemical substance managing company is the objective chemical substance managing company;

a release coefficient database for storing release coefficient data collected said collection means;

a collecting means for collecting material stocking information and stocked material use condition information related to a handling amount of material by accessing through said wide area network to said server managed by said chemical substance managing company;

a judging means for judging whether said product manufacturing maker is an objective product manufacturing maker or not;

a collecting means for collecting material composition data of material or product by accessing through said wide area network to said server managed by said product manufacturing maker in case that said judging means concludes that said product manufacturing maker is the objective product manufacturing maker;

a material composition database for storing material composition data collected by said collecting means, a collecting means for collecting managing substance data related to a chemical substance contained in material or product handled by said chemical substance managing company by accessing to said managing substance database through said wide area network;

a process tabulation processing means for calculating a handling amount of a chemical substance at said process on the basis of said handling amount of material, and said material component data and said managing substance data collected by said collection means; and an evaluation tabulation processing means for calculating a releasing and transferring amount for an individual release and transfer destination of said chemical substance at said process and at said chemical substance managing company on the basis of a handling amount of said chemical substance and said release coefficient database.

* * * * *